United States Patent
Hayashi

(10) Patent No.: US 12,192,430 B2
(45) Date of Patent: Jan. 7, 2025

(54) SYSTEM HAVING IMAGE PROCESSING APPARATUS THAT RECEIVES IMAGE DATA BY FAX, SERVER APPARATUS THAT PROVIDES CHAT RESPONSE CONCERNING IMAGE DATA, AND INFORMATION TERMINAL, STORAGE MEDIUM, CONTROL METHOD FOR INFORMATION TERMINAL, AND INFORMATION TERMINAL

(71) Applicant: CANON KABUSHIKI KAISHA, Tokyo (JP)

(72) Inventor: Tomonori Hayashi, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/069,654

(22) Filed: Dec. 21, 2022

(65) Prior Publication Data

US 2023/0216975 A1 Jul. 6, 2023

(30) Foreign Application Priority Data

Jan. 5, 2022 (JP) ................................ 2022-000583

(51) Int. Cl.
| | | |
|---|---|---|
| H04N 1/327 | (2006.01) | |
| H04N 1/00 | (2006.01) | |
| H04N 1/32 | (2006.01) | |

(52) U.S. Cl.
CPC ..... *H04N 1/32767* (2013.01); *H04N 1/00212* (2013.01); *H04N 1/32128* (2013.01); *H04N 1/32438* (2013.01)

(58) Field of Classification Search
CPC ........... H04N 1/32101; H04N 1/00244; H04N 1/00212
See application file for complete search history.

(56) References Cited

U.S. PATENT DOCUMENTS

2021/0099608 A1* 4/2021 Kamihisa ........... H04N 1/32769

FOREIGN PATENT DOCUMENTS

JP 2021057806 A 4/2021

* cited by examiner

*Primary Examiner* — Peter K Huntsinger
(74) *Attorney, Agent, or Firm* — ROSSI, KIMMS & McDOWELL LLP

(57) ABSTRACT

A system that enables a user to grasp processing status of image data easily. The system includes an image processing apparatus, a server apparatus, and an information terminal. The image processing apparatus includes a reception unit that receives image data through fax, and a transmission unit that transmits the image data received by the reception unit to the server apparatus. The server apparatus includes a transfer unit that transfers the image data to the information terminal. The information terminal includes a display unit that displays image data transferred by the transfer unit. The display unit displays information showing that a reply to the image data is completed at a position that does not overlap with the image data.

8 Claims, 27 Drawing Sheets

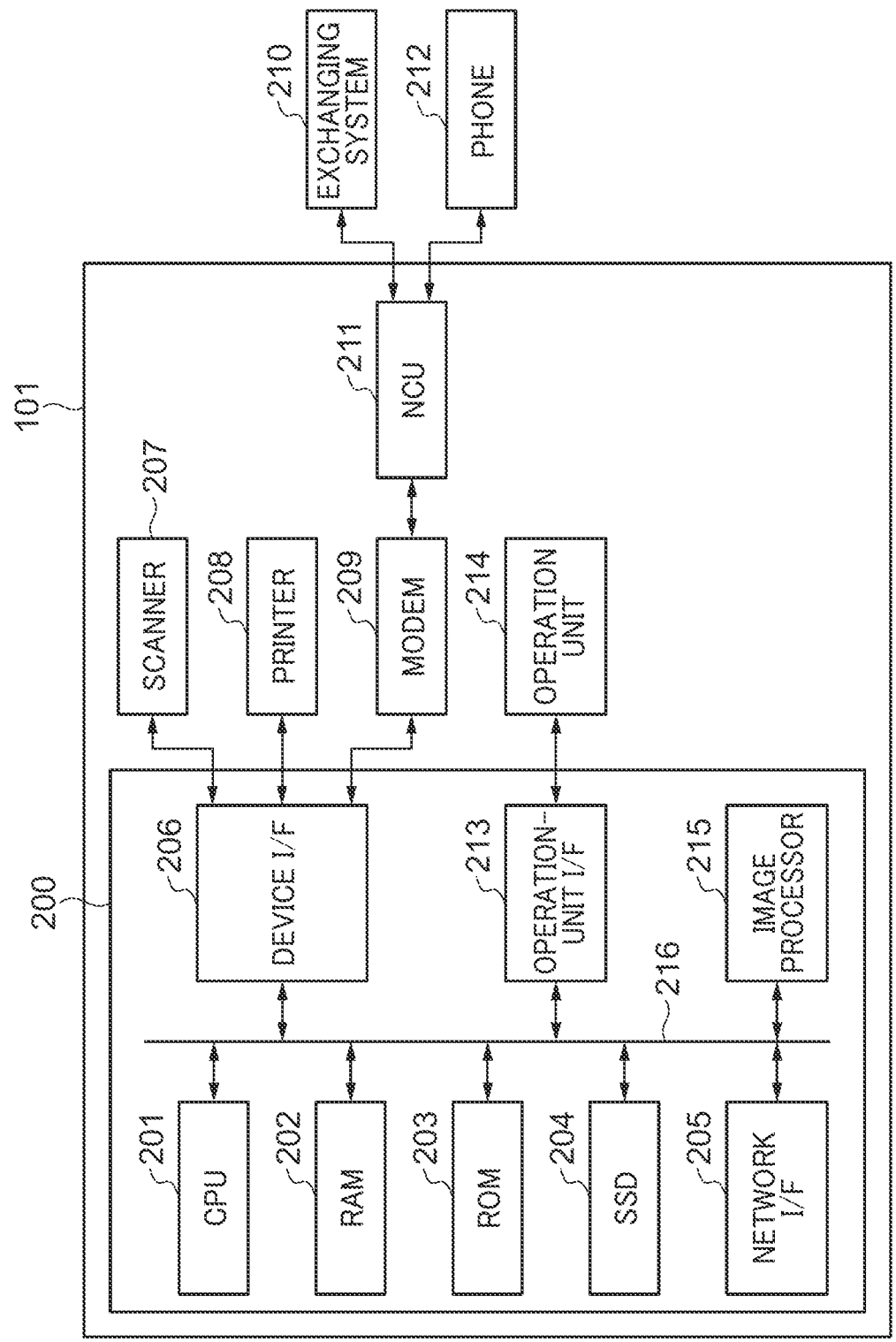

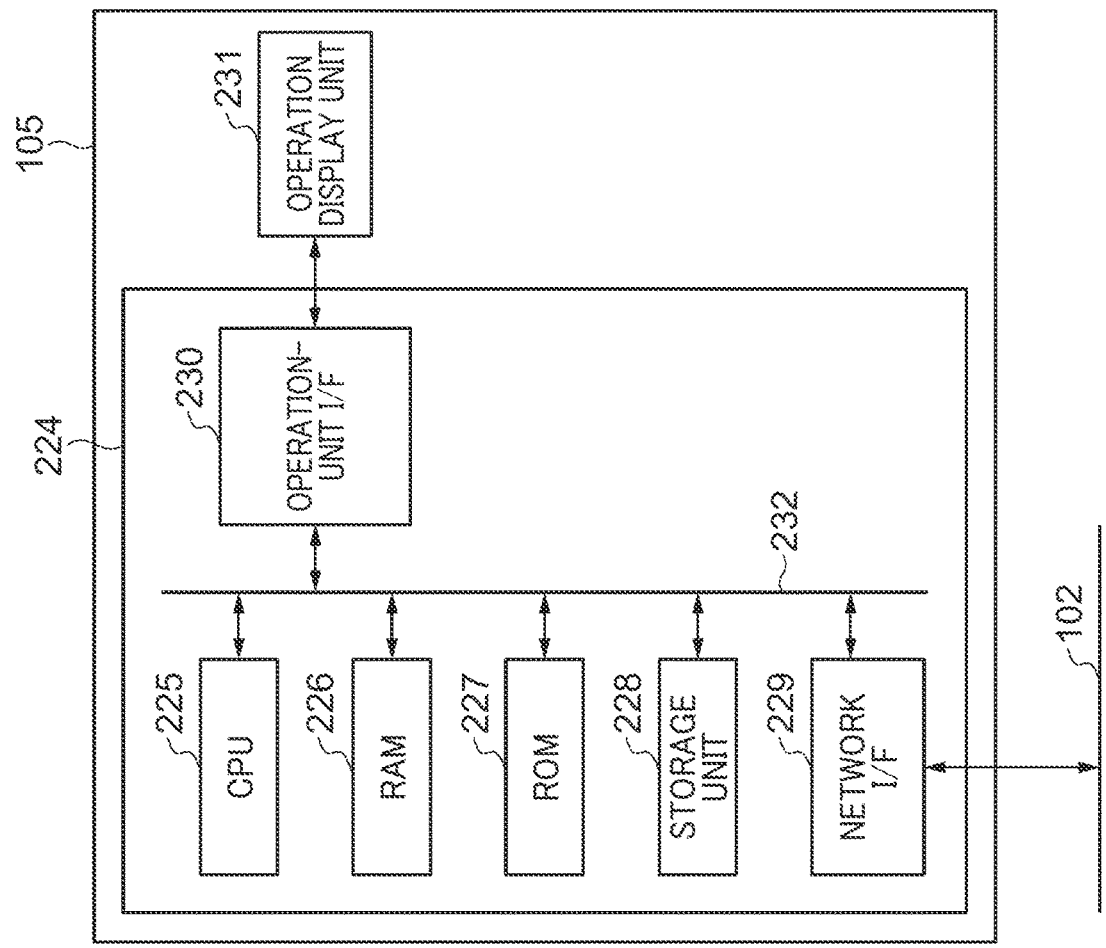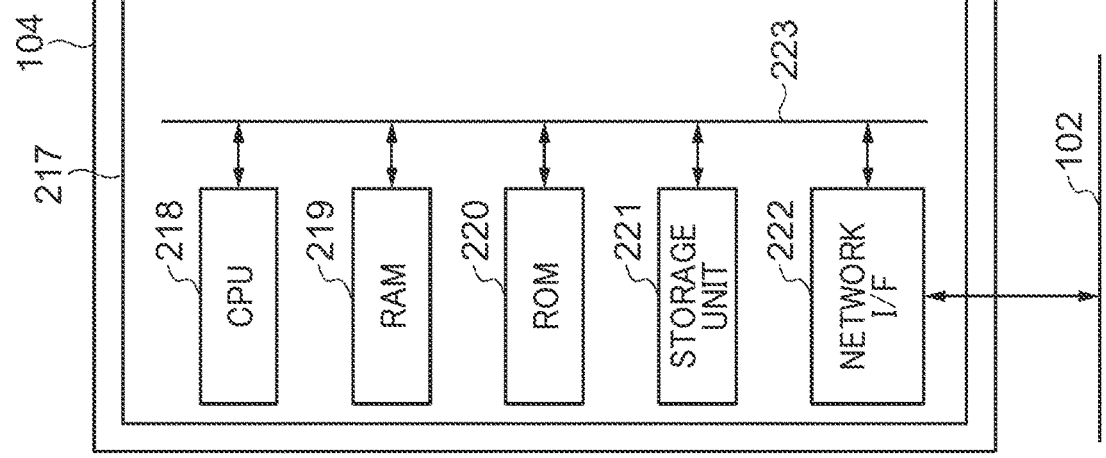

FAX IMAGE 701

FIG. 7D

| 705 | 706 | 707 | 708 | 709 | 710 | 711 | 712 | 713 | 714 |
|---|---|---|---|---|---|---|---|---|---|
| JOB ID | REPLAY SOURCE JOB ID | JOB TYPE | TRANSMISSION/ RECEPTION DATE | TRANSMISSION SOURCE PHONE | TRANSMISSION DESTINATION PHONE | APPLICATION IDENTIFICATION INFORMATION | STATUS | UPDATE USER | FAX DATA STORAGE PLACE |
| AAAA | - | FAX RECEPTION | 202x/xx/xx | 1234567 | 7654321 | AP0000 | REPLIED | USER A | /fax/imgxxxx |
| BBBB | AAAA | FAX RECEPTION | 202x/xx/xx | 7654321 | 1234567 | AP0000 | UNCHECKED | - | /fax/imgxxxx |
| CCCC | - | FAX RECEPTION | 202x/xx/xx | 1234567 | 7654321 | AP0000 | UNCHECKED | - | /fax/imgxxxx |
| DDDD | - | FAX RECEPTION | 202x/xx/xx | 1111111 | 7654321 | AP0000 | LATER PROCESSING | USER A | /fax/imgxxxx |
| EEEE | - | FAX RECEPTION | 202x/xx/xx | 2222222 | 7654321 | AP0000 | REPLIED | USER B | /fax/imgxxxx |
| FFFF | EEEE | FAX RECEPTION | 202x/xx/xx | 7654321 | 2222222 | AP0000 | UNCHECKED | - | |

FAX JOB LIST 716

FAX JOB MANAGEMENT TABLE 715

We have received FAX. We are confirming it.
Response will take two to five business days in general.
We appreciate your understanding.

Transmitter:XX XX

Received image

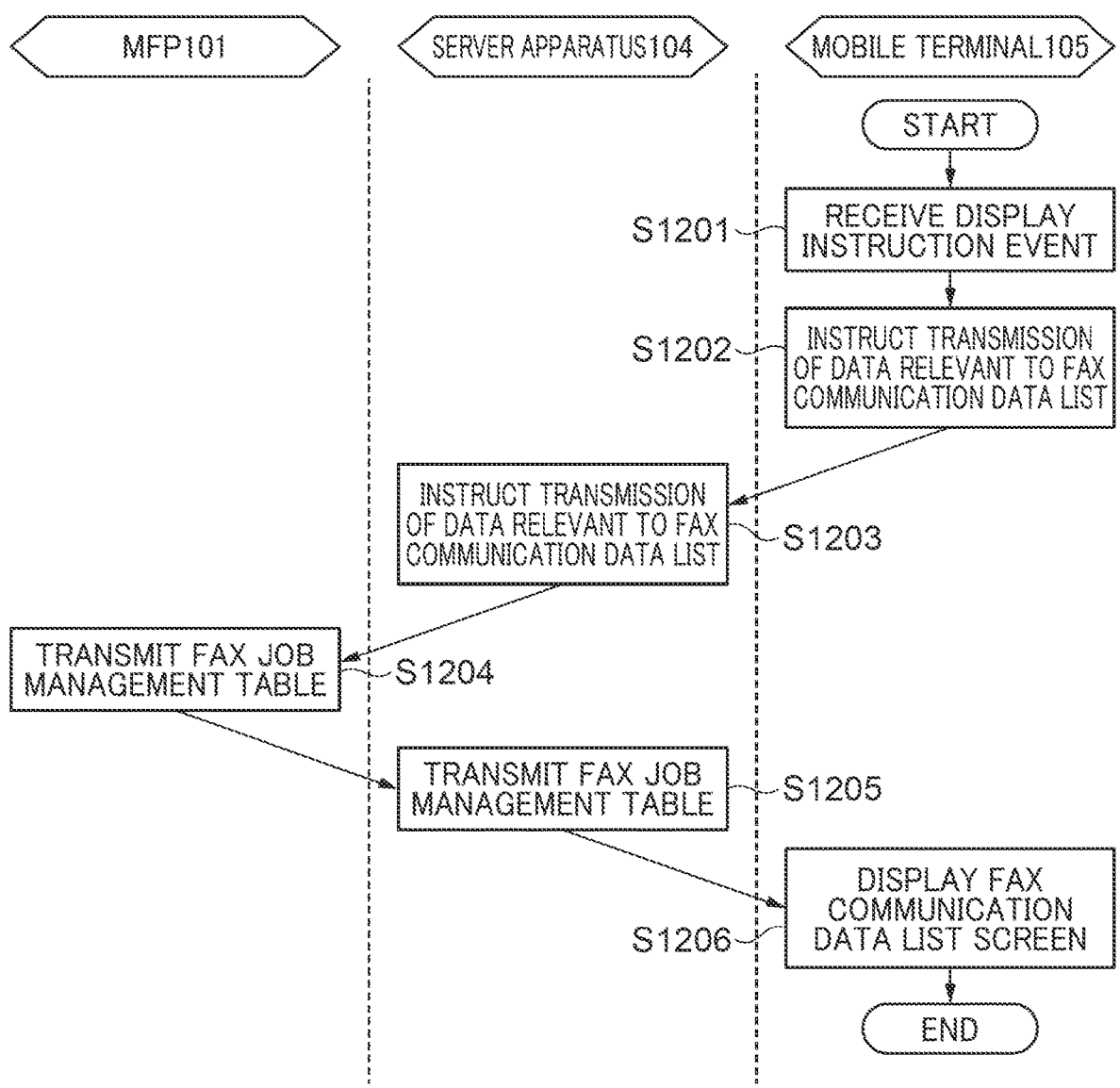

FIG. 15A

| JOB TYPE | TRANSMISSION/ RECEPTION DATE | TRANSMISSION SOURCE PHONE | TRANSMISSION DESTINATION PHONE | STATUS | UPDATE USER |
|---|---|---|---|---|---|
| FAX RECEPTION | 202x/xx/xx | 1234567 | 7654321 | REPLIED | USER A |
| FAX TRANSMISSION | 202x/xx/xx | 7654321 | 1234567 | UNCHECKED | - |
| FAX RECEPTION | 202x/xx/xx | 1234567 | 7654321 | UNCHECKED | - |
| FAX RECEPTION | 202x/xx/xx | 1111111 | 7654321 | UNCHECKED | - |

SYSTEM HAVING IMAGE PROCESSING APPARATUS THAT RECEIVES IMAGE DATA BY FAX, SERVER APPARATUS THAT PROVIDES CHAT RESPONSE CONCERNING IMAGE DATA, AND INFORMATION TERMINAL, STORAGE MEDIUM, CONTROL METHOD FOR INFORMATION TERMINAL, AND INFORMATION TERMINAL

BACKGROUND OF THE INVENTION

Field of the Invention

The present invention relates to a system having an image processing apparatus, a server apparatus, and an information terminal, a storage medium, a control method of an information terminal, and an information terminal.

Description of the Related Art

There is a known information processing system that manages data generated by execution of a job by an image forming apparatus. In this information processing system, the image forming apparatus transmits data received from another apparatus through FAX communication or E-mail, and image data of a document generated by reading the document set, for example, to a storage server that manages such data. Moreover, in this information processing system, various notifications are transmitted to a communication terminal equipped with an application that manages the data of the image forming apparatus. For example, in environment where a plurality of users manage data processing status of an image forming apparatus, a confirmative advice that urges confirmation of data transmitted to the storage server is transmitted to each user communication terminal (for example, see Japanese Laid-Open Patent Publication (Kokai) No. 2021-57806 (JP 2021-57806A), Counterpart of US 20210099608A1). Thereby, a user is able to know that it is necessary to check the data processing status.

However, each user cannot easily determine whether another user has already checked the data corresponding to the confirmative advice on the basis of only the confirmative advice mentioned above.

SUMMARY OF THE INVENTION

The present invention provides a mechanism that enable a user to grasp processing status of image data easily.

Accordingly, an aspect of the present invention provides a system including an image processing apparatus including a reception unit configured to receive image data through fax, and a transmission unit configured to transmit the image data received by the reception unit to a server apparatus, the server apparatus including a transfer unit configured to transfer the image data to an information terminal, and the information terminal including a display unit configured to display image data transferred by the transfer unit, wherein the display unit displays information showing that a reply to the image data is completed at a position that does not overlap with the image data.

According to the present invention, a user is able to grasp the processing status of the image data easily.

Further features of the present invention will become apparent from the following description of exemplary embodiments with reference to the attached drawings.

BRIEF DESCRIPTION OF THE DRAWINGS

FIG. 2A, FIG. 2B, and FIG. 2C are block diagrams respectively showing configurations of an MFP, a server apparatus, and a mobile terminal in FIG. 1.

FIG. 7A through FIG. 7D are views describing data used in FAX communication in the embodiment.

FIG. 12 is a sequence chart showing procedures of a display control process for a FAX communication data list in the embodiment.

FIG. 15A and FIG. 15B are views describing an operation method that changes a configuration of the FAX communication data list screen in FIG. 13A.

DESCRIPTION OF THE EMBODIMENTS

Figure 1:
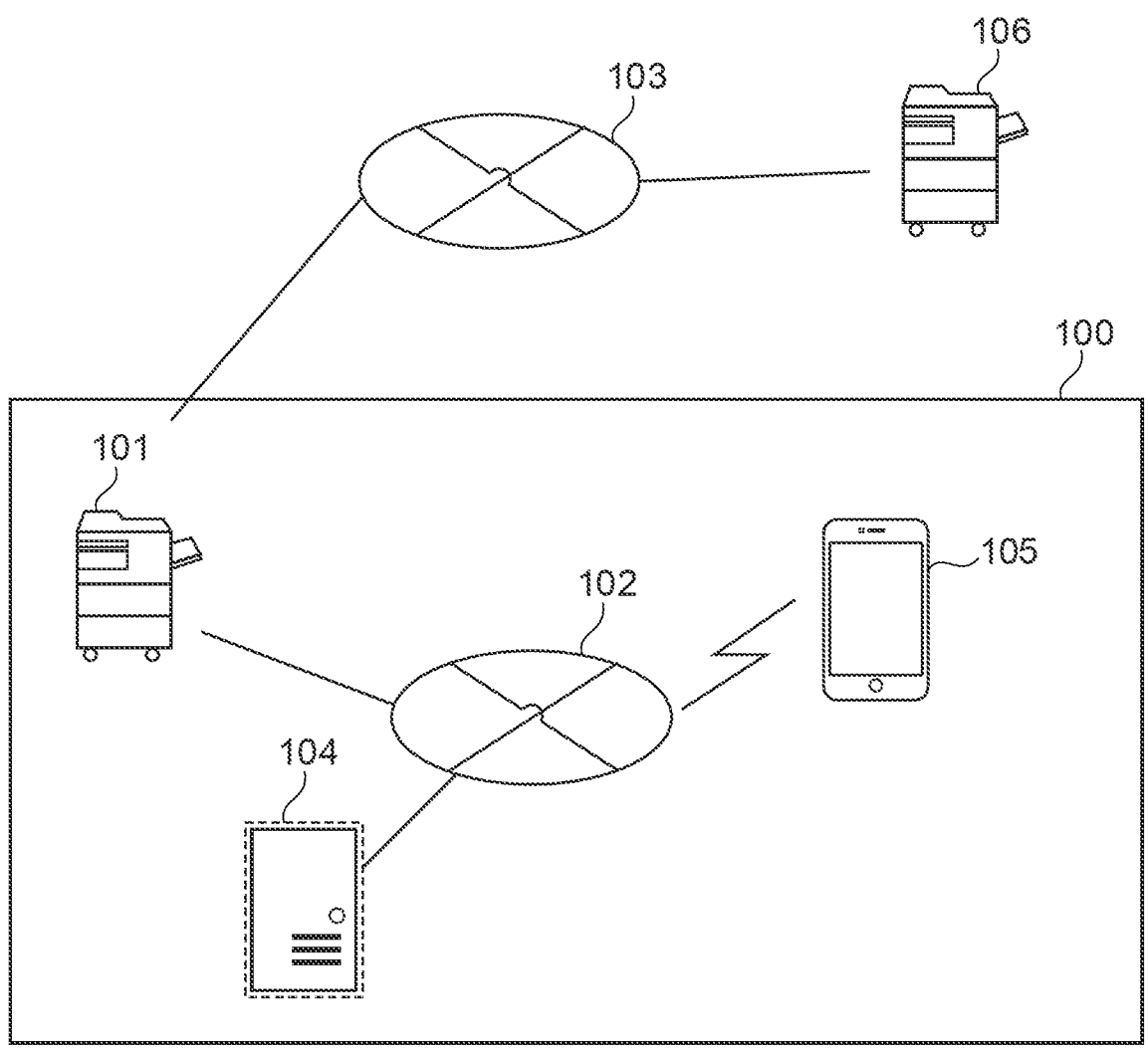
FIG. 1 is a view showing an example of a configuration of an information processing system according to an embodiment.

Hereafter, embodiments according to the present invention will be described in detail by referring to the drawings. A configuration described in the following embodiment is just an example, and the present invention is not limited to the configuration described in the embodiment.

FIG. 1 is a view showing an example of a configuration of an information processing system 100 according to an embodiment. As shown in FIG. 1, the information processing system 100 is provided with an MFP 101 as an image forming apparatus, a server apparatus 104, and a mobile terminal 105 as a communication terminal.

In the information processing system 100, data generated by execution of a job by the MFP 101 is managed. In the information processing system 100, the MFP 101 receives data from another apparatus, such as an MFP 106, through FAX communication or E-mail, and receives image data of a document generated by reading the document, for example. The MFP 101 transmits such data to the server apparatus 104 that manages such data.

The MFP 101 is a multifunction apparatus equipped with a plurality of functions, such as a copy function, a box function, a scan function, and a FAX communication function. The MFP 101 is communicable with the server apparatus 104 and mobile terminal 105 through a network 102. Moreover, the MFP 101 enables FAX communication with a FAX machine, such as the MFP 106, through a telephone network 103, such as an analog line or a digital line (ISDN).

The server apparatus 104 provides predetermined services and is provided with a storage server function, a notification server function, and a chat server function. The storage server function is a function as an SMB (Server Message Block) server of the network 102 to which the MFP 101 belongs. The notification server function is a function that notifies the mobile terminal 105 of information by relaying the MFP 101 to the mobile terminal 105. The chat server function is a function as a chatbot that returns a suitable chat text in response to a chat text received from the mobile terminal 105.

It should be noted that the MFP 101 may be provided with the functions of the server apparatus 104 in the embodiment. Moreover, a chat service provided by an external service or a service of SNS may be employed as substitution of the chat server function of the server apparatus 104. The mobile terminal 105 has a mobile application 510 in FIG. 5 mentioned later that manages data of the MFP 101.

Although the configuration where the information processing system 100 is provided with the mobile terminal 105 as a communication terminal is described in the embodiment, the present invention is not limited to this configuration. For example, the information processing system 100 may be provided with another communication terminal having a display unit like a client PC instead of the mobile terminal 105.

FIG. 2A, FIG. 2B, and FIG. 2C are block diagrams respectively showing configurations of the MFP 101, server apparatus 104, and mobile terminal 105 in FIG. 1. FIG. 2A is the block diagram schematically showing the configuration of the MFP 101 in FIG. 1. As shown in FIG. 2A, the MFP 101 is provided with a controller 200, a scanner 207, a printer 208, a modem 209, an NCU 211, and an operation unit 214.

The controller 200 is provided with a CPU 201, a RAM 202, a ROM 203, a solid state drive (hereinafter referred to as an "SSD") 204, a network I/F 205, a device I/F 206, an operation-unit I/F 213, and an image processor 215. The CPU 201, RAM 202, ROM 203, SSD 204, network I/F 205, device I/F 206, operation-unit I/F 213, and image processor 215 are mutually connected through an internal bus 216.

The CPU 201 reads a program stored in the ROM 203, develops it to the RAM 202, and runs it. Thereby, the CPU 201 functions as a controller that controls a plurality of functions of the MFP 101, such as a copy function, a box function, a scan function, and a FAX communication function. When a job, such as a scan job, a print job, or a copy job, is input into the MFP 101 on the basis of a user instruction input to the operation unit 214, the CPU 201 executes an image forming process based on the input job. The CPU 201 stores image data etc. that is obtained by executing the job into the SSD 204.

The RAM 202 is used as a main memory of the CPU 201 and a temporary storage area of various data. For example, the RAM 202 temporarily stores image data etc. that are processed by the image processor 215. The ROM 203 stores various programs including a program that executes processes of a software module group 300 in FIG. 3 mentioned later.

The SSD 204 stores image data etc. Although the configuration where the MFP 101 is provided with the SSD as a storage device is described in the embodiment, the storage device of the MFP 101 is not limited to the SSD. For example, a storage device that is provided with mass storage area, such as a hard disk drive (HDD), may be employed. The network I/F 205 controls communication with the mobile terminal 105 and server apparatus 104 that are connected through the network 102.

The device I/F 206 is connected to the scanner 207, printer 208, and modem 209, and executes a conversion process of image data between a synchronous system and an asynchronous system. The scanner 207 reads a set document and generates image data of the document concerned. The printer 208 prints the obtained image data to a sheet.

The modem 209 demodulates a modulation signal received through an exchange 210 connected to the MFP 101 and sends a modulation signal that is obtained by modulating a signal output from the controller 200 to the exchange 210. The NCU 211 detects a signal output from the exchange 210 and transfers it to the modem 209, and performs line control that switches a line to a phone 212.

The operation-unit I/F 213 is an interface connected to the operation unit 214. The operation-unit I/F 213 outputs a signal showing an instruction that is input to the operation unit 214 by a user to the internal bus 216. Moreover, the operation-unit I/F 213 obtains display data through the internal bus 216 and displays the display data concerned on the operation unit 214. The image processor 215 applies various images conversion processes to the image data.

FIG. 2B is the block diagram schematically showing the configuration of the server apparatus 104 in FIG. 1. As shown in FIG. 2B, the server apparatus 104 is provided with the controller 217. The controller 217 is provided with a CPU 128, RAM 219, ROM 220, storage unit 221, and network I/F 222. The CPU 218, RAM 219, ROM 220, storage unit 221, and network I/F 222 are mutually connected through an internal bus 223.

The CPU 218 reads a program stored in the ROM 220, develops it to the RAM 219, and runs it. Thereby, the CPU 218 functions as a controller which controls the above-mentioned storage server function, notification server function, chat server function, etc. The RAM 202 is used as a main memory of the CPU 218 and a temporary storage area of various data. The ROM 203 stores various programs including a program that executes processes of a software module group 400 in FIG. 4 mentioned later. The storage unit 221 is a storage device, such as an HDD, and stores data received from the MFP 101. The network I/F 222 controls communication with the mobile terminal 105 and server apparatus 101 that are connected through the network 102.

FIG. 2C is the block diagram schematically showing the configuration of the mobile terminal 105 in FIG. 1. As shown in FIG. 2C, the mobile terminal 105 is provided with a controller 224 and an operation-display unit 231. The controller 224 is provided with a CPU 225, RAM 226, ROM 227, storage unit 228, and network I/F 230. The CPU 225, RAM 226, ROM 227, storage unit 228, and network I/F 229 are mutually connected through an internal bus 232.

The CPU 225 reads a program stored in the ROM 227, develops it to the RAM 226, and runs it. The RAM 226 is used as a main memory of the CPU 225 and a temporary storage area of various data. The ROM 227 stores various programs including a program that executes an OS 500 in FIG. 5 mentioned later.

The storage unit 228 is a storage device, such as an HDD. The network I/F 229 controls communication with the MFP 101 and server apparatus 104 that are connected through the network 102. The operation-unit I/F 230 is an interface connected to the operation-display unit 231. The operation-unit I/F 230 obtains display data through the internal bus 232 and displays the display data concerned on the operation-display unit 231.

The operation-unit I/F 230 outputs a signal showing an instruction that is input to the operation-display unit 231 by a user to the internal bus 232. The operation-display unit 231 is a touch panel display unit, for example. The operation-display unit 231 detects an input operation by a resistance film system, an infrared system, an electromagnetic induction system, or a capacitive sensing method, for example. It should be noted that an input operation by a user may be detected by hardware input devices, such as a switch and a keyboard.

Figure 3:
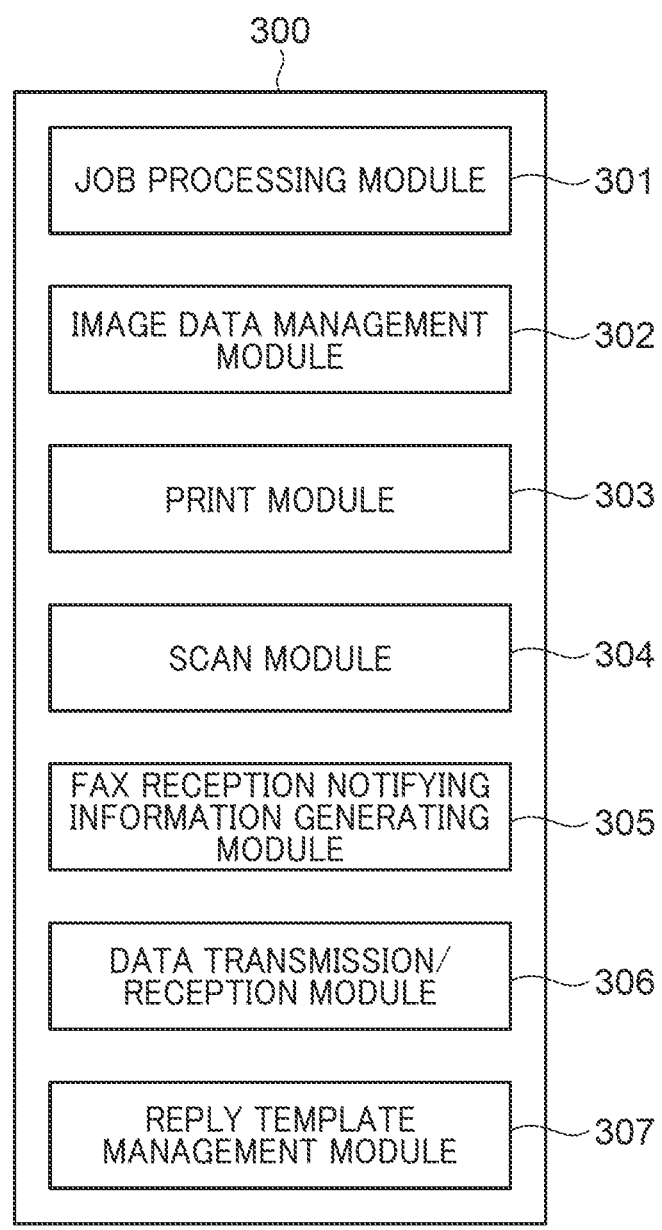
FIG. 3 is a view showing an example of a software module group of the MFP in FIG. 1.

FIG. 3 is a view showing an example of the software module group 300 of the MFP 101 in FIG. 1. As shown in FIG. 3, the software module group 300 includes a job processing module 301, an image data management module 302, a print module 303, a scan module 304, a FAX reception notification information generating module 305, a data transmission/reception module 306, and a reply template management module 307.

Processes of the software module group 300 are achieved by reading and running programs stored in the ROM 203 by the CPU 201. Although the programs for executing the processes of the software module group 300 shall be stored in the ROM 203 in the description of this embodiment, the programs may be stored in another storage device that has a capacity sufficient to record the programs concerned. For example, the above-mentioned programs may be stored in a dedicated area allocated to the SSD 204.

The job processing module 301 manages a job input by a user operation to the operation unit 214, a FAX reception job that receives FAX data through the modem 209, etc. For example, when a copy job is input by a user operation to the operation unit 214, the job processing module 301 controls the scan module 304 to execute a scan process to a document concerning this copy job. Thereby, the image data of the document concerned is generated by the scanner 207.

Next, the job processing module 301 controls the image data management module 302 to execute a process that records the image data generated by the scanner 207 to the SSD 204. Thereby, the image data is stored in the SSD 204. Next, the job processing module 301 controls the print module 303 to execute a print process of the image data stored in the SSD 204. Thereby, the image data concerned is printed on a sheet.

Moreover, when the FAX reception job is received, the job processing module 301 controls the image data management module 302 to execute a process that records FAX data received through the modem 209 to the SSD 204. Furthermore, the job processing module 301 obtains reception information, which includes a phone number of a FAX transmission source and a phone number of an apparatus that receives FAX, through the modem 209 and records the reception information as bibliographic information to the SSD 204.

The image data management module 302 records image data concerning a job to the SSD 204 and reads it from the SSD 204. The print module 303 executes a print process of image data concerning a job. The scan module 304 generates image data concerning a job by controlling the scanner 207 to execute a scan process of a document. The FAX reception notification information generating module 305 generates FAX reception notification information given to the mobile terminal 105. The data transmission/reception module 306 performs data communication with the server apparatus 104, the mobile terminal 105, etc. Moreover, the data transmission/reception module 306 converts a FAX image received from another FAX machine into a predetermined data format (TIFF, PDF, MSOffice, or the like) and transfers the converted data to the server apparatus 104. The reply template management module 307 stores a reply message as a reply template in the SSD 204 and manages it.

Figure 4:
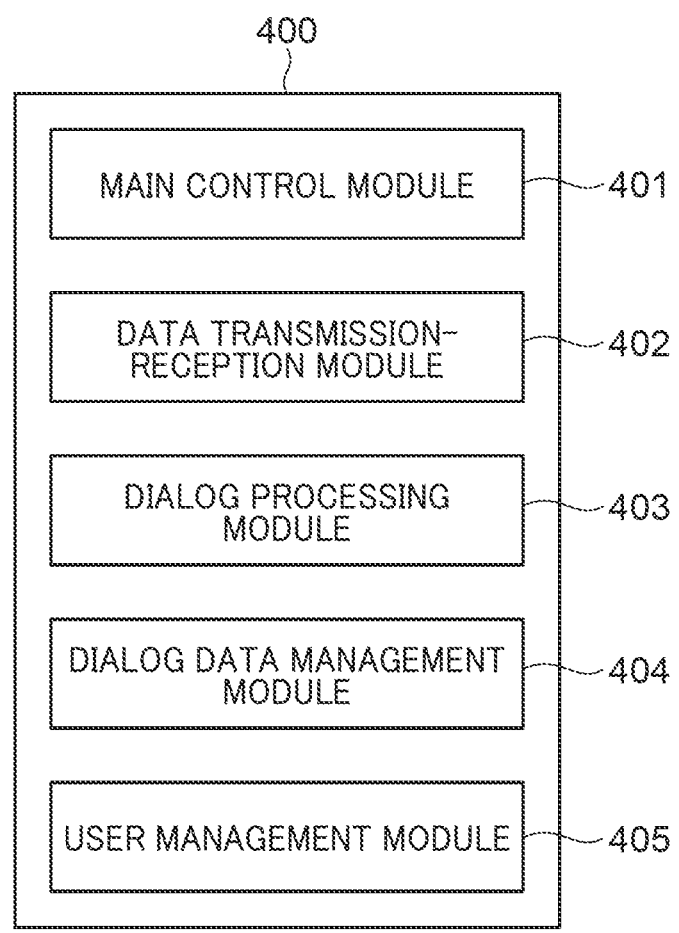
FIG. 4 is a view showing an example of a software module group of the server apparatus in FIG. 1.

FIG. 4 is a view showing an example of the software module group 400 of the server apparatus 104 in FIG. 1. As shown in FIG. 4, the software module group 400 includes a main control module 401, data transmission/reception module 402, dialog processing module 403, dialog data management module 404, and user management module 405. Processes of the software module group 400 are achieved by reading and running programs stored in the ROM 220 by the CPU 218.

The main control module 401 gives an instruction to each module and manages each module. The data transmission/reception module 402 transmits and receives data to and from the mobile terminal 105 and MFP 101, and exchanges data that are transmitted and received with the main control module 401. The dialog processing module 403 includes an automatic dialog program and has a function to interpret a content of a chat text. The dialog processing module 403 performs a process by grasping a content of an instruction of a chat. The dialog data management module 404 manages dialog data. Dialog data is a chat text required for a dialog process.

The user management module 405 manages a user who uses the MFP 101 and a user who uses the mobile application 510 of the mobile terminal 105. The user management module 405 performs user authentication on the basis of a user name and password that are stored as user information. Moreover, the user management module 405 executes a process that logs in a service provided by the server apparatus 104 and logs out from the service.

Figure 5:
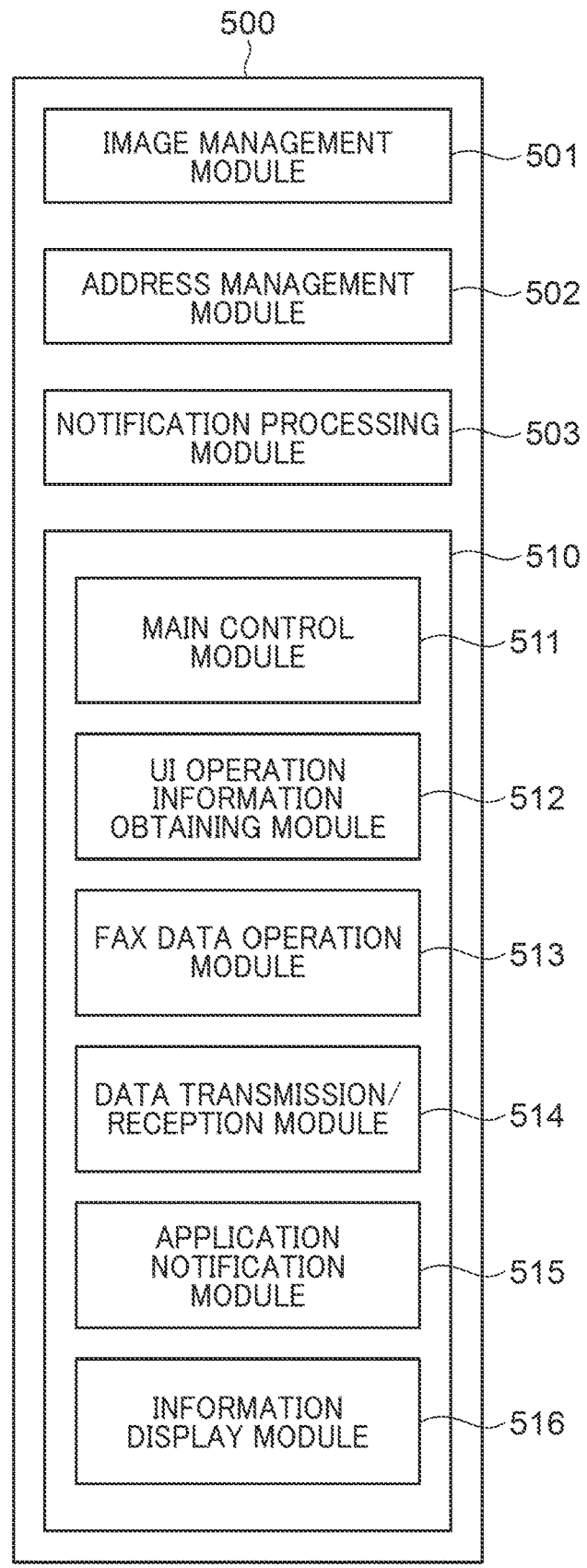
FIG. 5 is a view showing an example of an OS of the mobile terminal in FIG. 1.

FIG. 5 is a view showing an example of the OS 500 of the mobile terminal 105 in FIG. 1. As shown in FIG. 5, the OS 500 includes an image management module 501, an address management module 502, a notification processing module 503, and the mobile application 510. A process of the OS 500 is achieved by reading and running a program stored in the ROM 227 by the CPU 225.

The image management module 501 manages an image and application data. The OS 500 provides a control API for using the image management module 501. Each application obtains or stores an image and application data that are managed by the image management module 501 by using the control API.

The address management module 502 manages address information including a name, a phone number, an address, etc. The notification processing module 503 receives notification information from the server apparatus 104, specifies an application that becomes a notification destination using later-mentioned application identification information 711 in FIG. 7 included in the notification information, and transmits the notification information to the specified application.

The application identification information 711 is generated from a later mentioned application identifier for identifying the mobile application 510 and a mobile terminal identifier for identifying the mobile terminal 105. In the embodiment, the application identification information 711 that shows the mobile terminal 105 and mobile application 510 shall be beforehand set up to the MFP 101 as information about a notification destination.

The mobile application 510 is installed using an installation function of the OS 500. The mobile application 510 requests the server apparatus 104 to execute a data process to the data that is managed by the server apparatus 104. The mobile application 510 consists of a main control module 511, a UI operation information obtaining module 512, a FAX data operation module 513, a data transmission/reception module 514, an application notification module 515, and an information display module 516.

The main control module 511 controls the mobile application 510 and issues instructions to the modules that constitute the mobile application 510 to manage them. A chat function for chatting with the server apparatus 104 is also installed in the main control module 511.

The information display module 516 displays a UI screen that becomes a user interface of the mobile application 510 on the operation-display unit 231. For example, a mobile terminal screen 600 shown in FIG. 6 is displayed.

Figure 6:
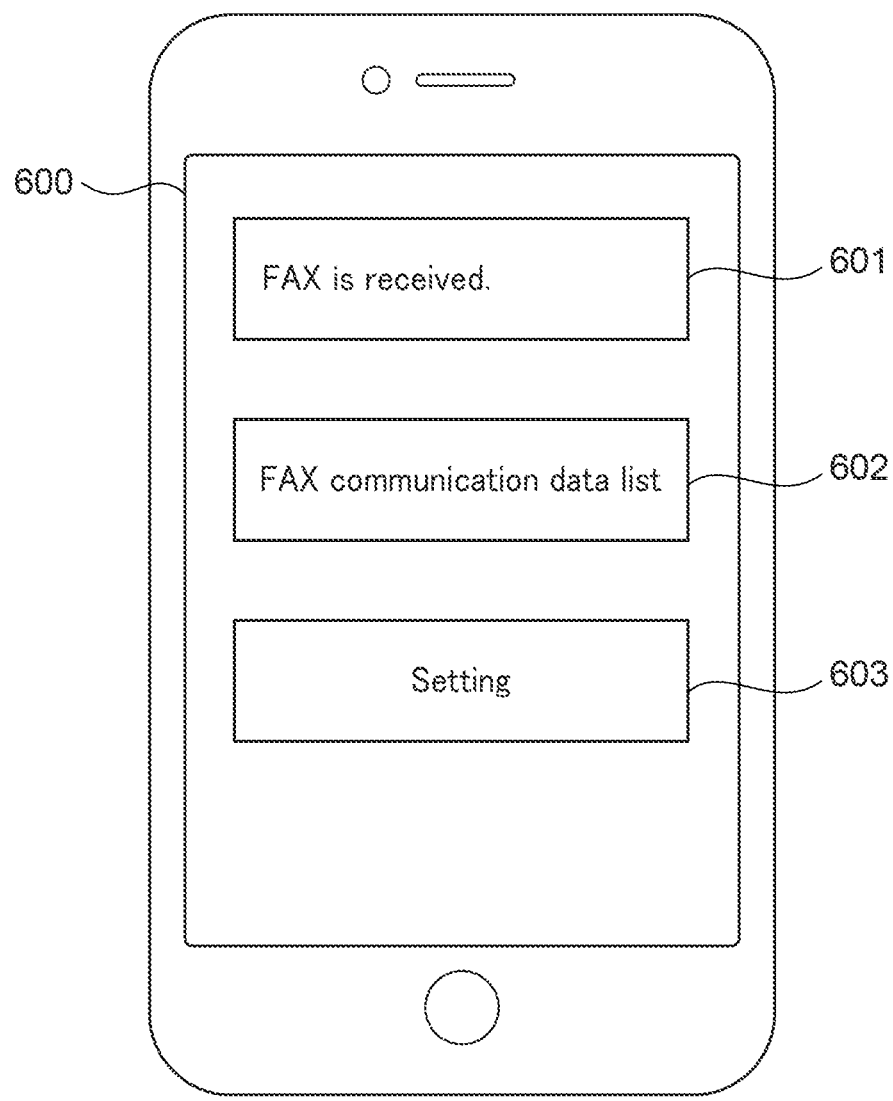
FIG. 6 is a view showing an example of a mobile terminal screen displayed on an operation-display unit in FIG. 2C.

FIG. 6 is a view showing an example of the mobile terminal screen 600 displayed on the operation-display unit 231 in FIG. 2C. A notification 601 showing that FAX data is received is displayed on the mobile terminal screen 600. When a user touches the notification 601, a chat screen as shown in the FIG. 9 mentioned later is displayed on the operation-display unit 231, for example.

Although the message showing that the FAX data is received is displayed as an example of the notification 601 in FIG. 6, a message suitable for an object may be displayed as the notification 601. For example, when a status of a job is changed, a message showing the change is displayed as the notification 601. Moreover, a FAX communication data list button 602 and a setting button 603 are displayed on the mobile terminal screen 600. The FAX communication data list button 602 is used when displaying a data list of transmissions and receptions of FAX of the MFP 101. The setting button 603 is used when changing settings of the mobile application 510.

Returning back to FIG. 5, the UI operation information obtaining module 512 obtains information about a user operation on the UI screen, such as the mobile terminal screen 600, displayed on the operation-display unit 231 and transmits the obtained information to the main control module 511. For example, the UI operation information obtaining module 512 transmits position information showing a position touched by a user on the mobile terminal screen 600 to the main control module 511.

The FAX data operation module 513 operates (for example, moves, copies, or deletes) FAX data according to a designation by a user on the UI screen of the mobile application 510. The data transmission/reception module 514 transmits and receives data to and from the server apparatus 104. The application notification module 515 executes various processes on the basis of the notification information transmitted from the notification processing module 503 to the mobile application 510.

Next, the data used in the FAX communication in the embodiment will be described by referring to FIG. 7A through FIG. 7D.

Figure 7A:
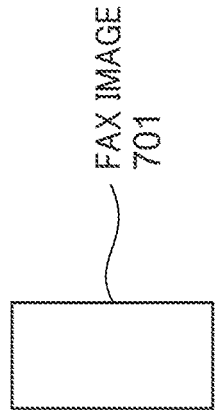

A FAX image 701 in FIG. 7A is image data that is received by the MFP 101 from another FAX machine by the FAX communication through a public line or image data that is transmitted from the MFP 101 to another FAX machine by the FAX communication.

Figure 7B:
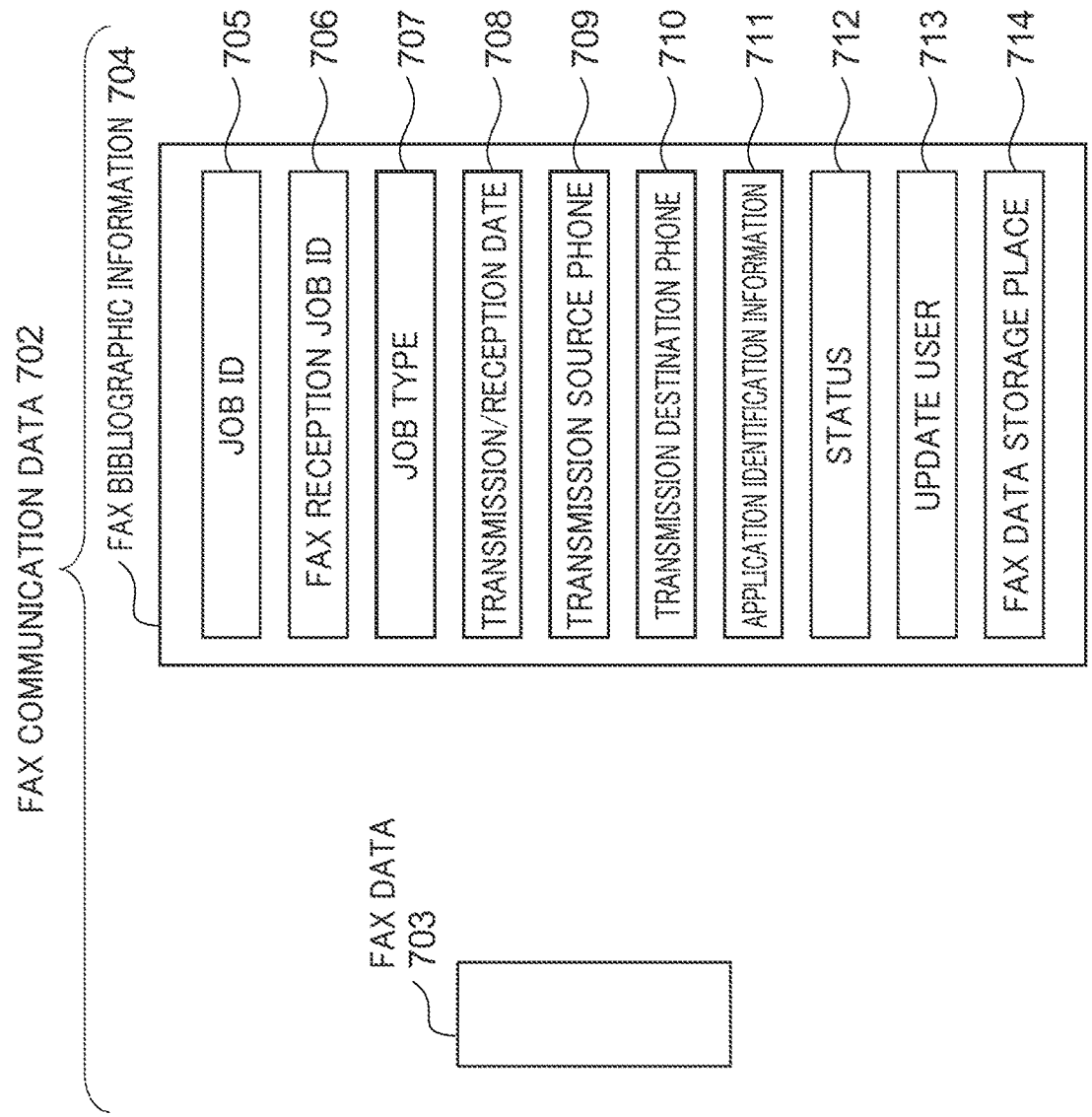

FAX communication data 702 in FIG. 7B includes FAX data 703 that is obtained by converting the FAX image 701 into a predetermined data format, such as a TIFF format, and FAX bibliographic information 704.

The FAX bibliographic information 704 includes a job ID 705, a FAX reception job ID 706, a job type 707, transmission/reception date 708, a transmission source phone 709, a transmission destination phone 710, application identification information 711, a status 712, an update user 713, and a FAX data storage place 714.

A number for specifying a job issued by the MFP 101 is set to the job ID 705. The job ID is managed with a unique serial number, such as a UUID (Universally Unique Identifier). When the received FAX image 701 is replied to the transmission source apparatus, a job ID of the FAX reception job that receives the FAX image 701 concerned is set to the FAX reception job ID 706. A type of a job is set to the job type 707. In the embodiment, "FAX reception" or "FAX transmission" is set to the job type 707.

Received date of the FAX image 701 or transmitted date of the FAX image 701 is set to the transmission/reception date 708. A telephone number of the transmission source apparatus of the FAX image 701 is set to the transmission source phone 709. For example, when the MFP 101 receives the FAX image 701 from another FAX machine, the telephone number of the other FAX machine that transmits the FAX image 701 is set to the transmission source phone 709. In the meantime, when the MFP 101 transmits the FAX image 701 to another FAX machine, the telephone number of the MFP 101 that transmits the FAX image 701 is set to the transmission source phone 709.

A telephone number of the reception apparatus of the FAX image 701 is set to the transmission destination phone 710. For example, when the MFP 101 receives the FAX image 701 from another fax machine, the telephone number of the MFP 101 that receives the FAX image 701 is set to the transmission destination phone 710. In the meantime, when the MFP 101 transmits the FAX image 701 to another FAX machine, the telephone number of the other FAX machine that receives the FAX image 701 is set to the transmission destination phone 710.

Figure 7C:
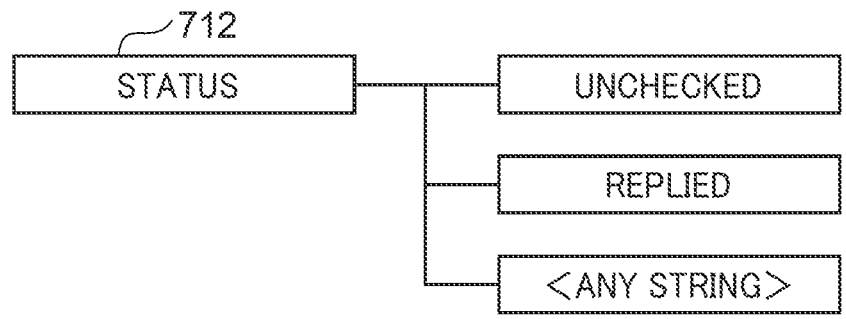

Information generated from an application identifier for identifying the mobile application 510 and a mobile terminal identifier for identifying the mobile terminal 105 is set to the application identification information 711. Information about the status of the FAX job is set to the status 712. A value of "unconfirmed" shown in FIG. 7C is set to the status 712 as an initial value. Moreover, when the FAX image 701 is replied to the transmission source apparatus, a value "replied" in FIG. 7C showing the fact is set to the status 712. It should be noted that a user is able to set any character string showing the status of the FAX job other than these values in the embodiment. The details of setting of the status 712 are mentioned later.

Information about a user who updates the status 712 of the FAX job is set to the update user 713. The details of setting of the update user 713 are mentioned later. Information showing a place in which the FAX data is stored is set to the FAX data storage place 714.

Moreover, the FAX bibliographic information 704 about the FAX job executed by the MFP 101 is recorded in a FAX job management table 715 in FIG. 7D as a FAX job list 716 in the embodiment. The FAX job management table 715 is stored (held) in the SSD 204 etc. of the MFP 101.

Figure 8:
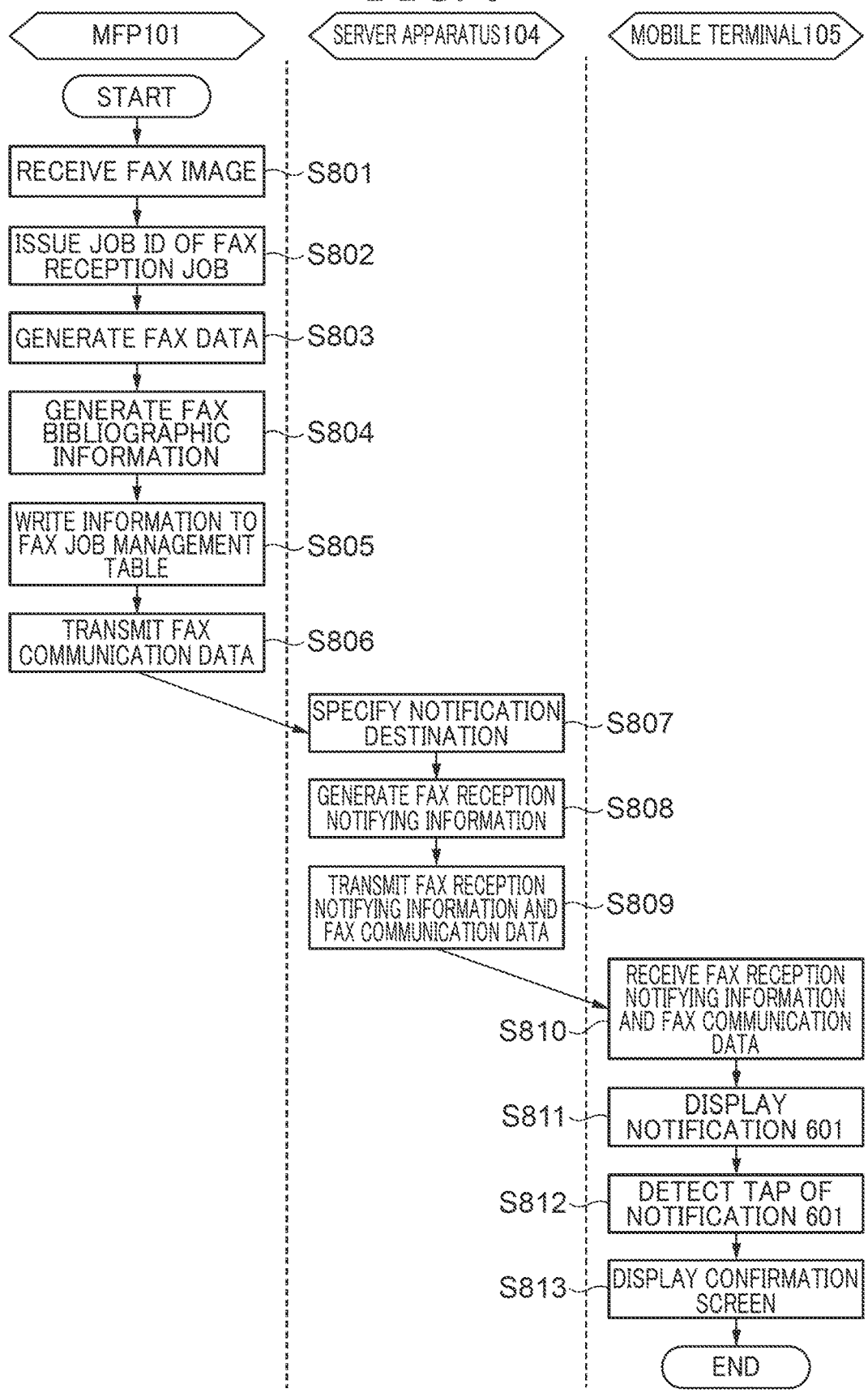
FIG. 8 is a sequence chart showing a flow of a series of processes executed until the mobile terminal displays a confirmation screen on the operation-display unit after the MFP in FIG. 1 receives a FAX image from another FAX machine.

Next, the notification to the mobile terminal 105 when the MFP 101 receives the FAX image 701 from another FAX machine will be described using FIG. 8. FIG. 8 is a sequence chart showing a flow of a series of processes executed until the mobile terminal 105 displays a confirmation screen mentioned later on the operation-display unit 231 after the MFP 101 in FIG. 1 receives the FAX image 701 from the other FAX machine.

The processes in FIG. 8 are executed by the MFP 101, server apparatus 104, and mobile terminal 105 that constitute the information processing system 100. The process by the MFP 101 is achieved by executing a program stored in the ROM 203 etc. by the CPU 201 of the MFP 101. The process by the server apparatus 104 is achieved by executing a program stored in the ROM 220 etc. by the CPU 218 of the server apparatus 104. The process by the mobile terminal 105 is achieved by executing a program stored in the ROM 227 etc. by the CPU 225 of the mobile terminal 105.

As shown in FIG. 8, the CPU 201 of the MFP 101 first receives the FAX image 701 from another FAX machine like the MFP 106 in a step S801. Then, the CPU 201 stores the received FAX image 701 and FAX information in the SSD 204 etc. The FAX information includes the telephone number of the MFP 106 that is the transmission source, the time at which the FAX image 701 is received, etc.

In the next step S802, the CPU 201 issues a job ID of the FAX reception job corresponding to the reception of the FAX image 701 with the job processing module 301. In the next step S803, the CPU 201 generates FAX data 703 that is obtained by converting the FAX image 701 into a predetermined data format like a TIFF format with the data transmission/reception module 306. The FAX data 703 is stored in the SSD 204 etc.

In the next step S804, the CPU 201 generates the FAX bibliographic information 704 on the basis of the FAX information stored in the SSD 204 etc. with the job processing module 301. The job ID issued in the step S802 is set to the job ID 705 of the FAX bibliographic information 704. "FAX reception" is set to the job type 707. The date on which the MFP 101 receives the FAX image 701 from the MFP 106 in the step S801 is set to the transmission/reception date 708.

A telephone number of the MFP 106 that transmits the FAX image 701 is set to the transmission source phone 709. A telephone number of the MFP 101 that receives the FAX image 701 is set to the transmission source phone 710. The information about the notification destination beforehand registered into the MFP 101 is set to the application identification information 711. Specifically, the mobile terminal identifier for identifying the mobile terminal 105 and the application identifier for identifying the mobile application of the mobile terminal 105 are set to the application identification information 711. The initial value of "unconfirmed" is set to the status 712. An initial value "unset (–)" is set to the update user 713. A storage place of the FAX data 703 generated in the step S803 is set to the FAX data storage place 714. The FAX bibliographic information 704 generated in the step S804 is also stored in the SSD 204 etc.

In the next step S805, the CPU 201 writes the FAX bibliographic information 704 generated in the step S804 in the FAX job management table 715 with the job processing module 301. Next, the CPU 201 is connected to the server apparatus 104 with the job processing module 301.

In the next step S806, the CPU 201 transmits the FAX communication data 702 including the above-mentioned FAX data 703 and FAX bibliographic information 704 to the server apparatus 104 with the data transmission/reception module 306. It should be noted that the FAX communication data 702 is stored in the server apparatus 104 by any method, such as a WebDAV, upload by the SMB protocol, or upload by an original Web service.

In the next step S807, the CPU 218 of the server apparatus 104 specifies the mobile terminal 105 that is a notification destination on the basis of the application identification information 711 in the FAX bibliographic information 704 received from the MFP 101. In the next step S808, the CPU 218 generates FAX reception notification information for displaying the notification 601 on the basis of the FAX bibliographic information 704. In the next step S809, the CPU 218 transmits the FAX reception notification information and FAX communication data 702 to the mobile terminal 105 that is specified as the notification destination in the step S807.

In a step S810, the CPU 225 of the mobile terminal 105 receives the FAX reception notification information and FAX communication data 702 from the server apparatus 104 with the notification processing module 503. Then, the CPU 225 specifies the mobile application 510 from the application identification information 711 and outputs the FAX reception notification information to the mobile application 510.

In the next step S811, the mobile application 510 displays the notification 601 on the operation-display unit 231 of the mobile terminal 105 on the basis of the received FAX reception notification information with the information display module 516. In the next step S812, the UI operation information obtaining module 512 of the mobile application 510 detects a tap of the notification 601 by a user. When detecting the tap of the notification 601, the UI operation information obtaining module 512 notifies the main control module 511 of a display instruction of a confirmation screen in FIG. 9A.

Figure 9A:
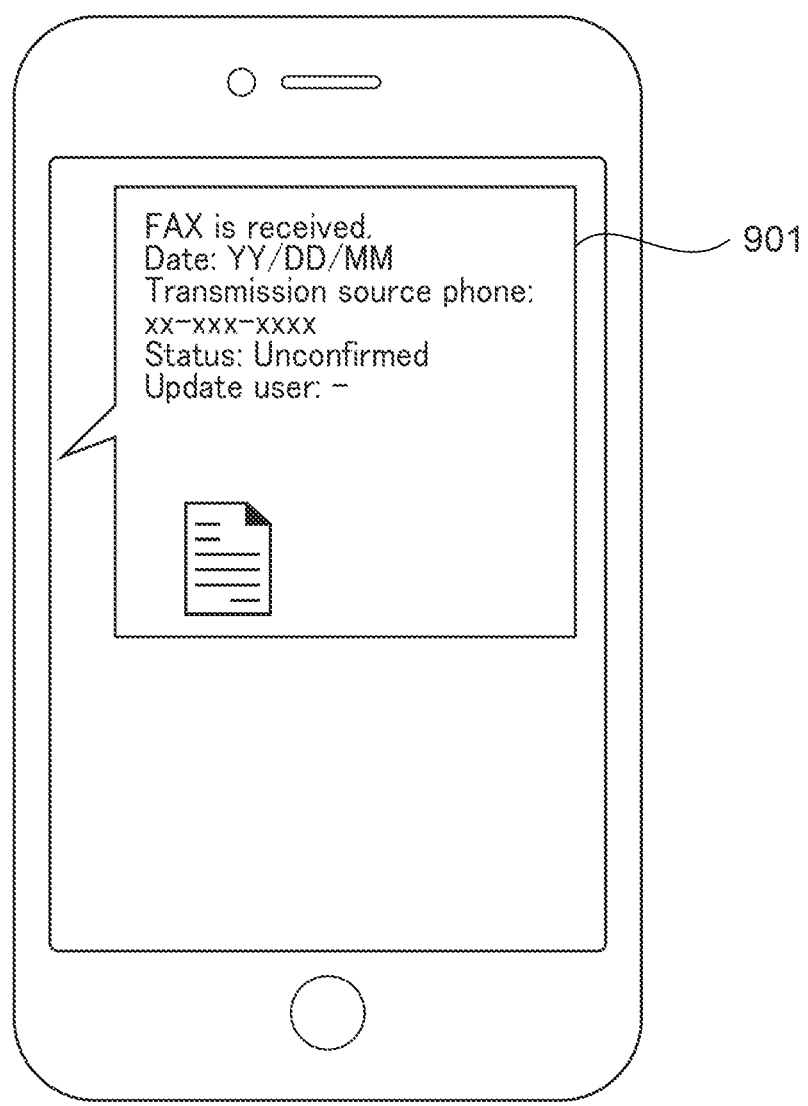
FIG. 9A and FIG. 9B are views showing examples of screens displayed on the operation-display unit in FIG. 2C.

In the next step S813, the CPU 225 of the mobile terminal 105 displays the confirmation screen in FIG. 9A on the operation-display unit 231 with the information display module 516. And then, this process is finished.

Figure 9B:
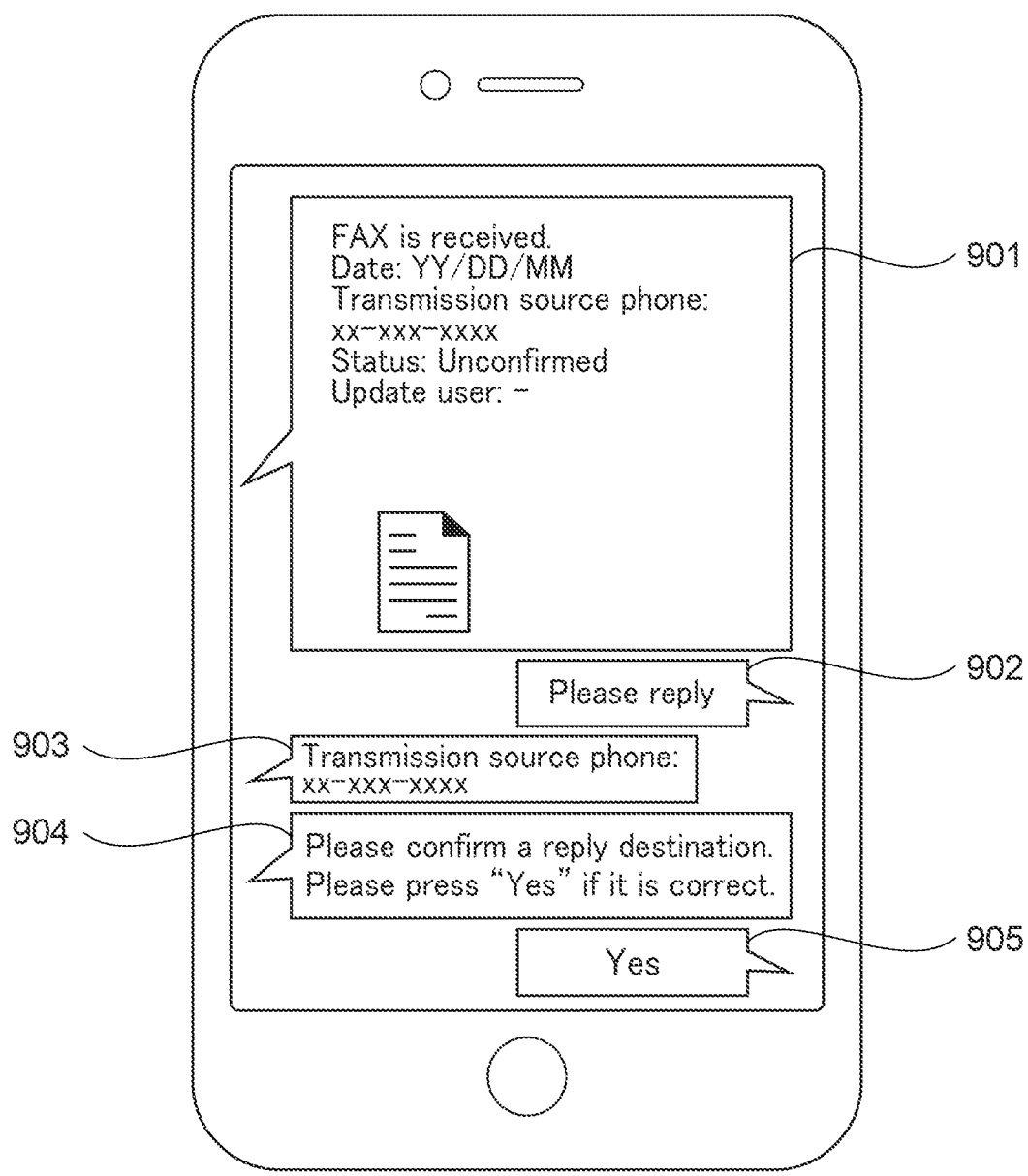

FIG. 9A and FIG. 9B are views showing examples of screens displayed on the operation-display unit 231 in FIG. 2C. FIG. 9A is a view showing an example of the confirmation screen displayed on the operation-display unit 231 of the mobile terminal 105 in the step S813.

In the step S813, a message 901 including information based on the FAX bibliographic information 704 and the FAX data 703 is displayed on the operation-display unit 231. The user can grasp the contents of the FAX reception by confirming the message 901.

In the embodiment, the user can reply to the transmission source phone included in the message 901 displayed on the operation-display unit 231 by FAX communication using a chat function. At this time, the server apparatus 104 functions as a chatbot. The dialog processing module 403 chats to the mobile terminal 105 on the basis of the dialog data management module 404 and specifies a content instructed from the mobile terminal 105. When the specified content is an execution instruction of a reply process that replies to the FAX transmission source, the server apparatus 104 transmits the FAX bibliographic information 704 at the time of the FAX reception to the MFP 101. Then, the MFP 101 executes the reply process. The user who operates the mobile terminal 105 shall be executing a login process to the service provided by the server apparatus 104.

FIG. 9B shows a screen example displayed when the reply by the FAX communication is instructed. As shown in FIG. 9B, the user operates the mobile terminal 105 to input a message 902 of "Please reply". This message 902 is displayed on the operation-display unit 231 of the mobile terminal 105 as shown in FIG. 9B, and text data of the message 902 is transmitted to the server apparatus 104.

When receiving the text data of the message 902, the dialog processing module 403 of the server apparatus 104 recognizes it as the execution instruction of the reply process on the basis of the character string "reply" and determines that confirmation of a "reply destination" is required. Then, the dialog processing module 403 transmits text data of "Please confirm a reply destination and press "Yes" if it is correct." to the mobile terminal 105.

When receiving the text data, the mobile terminal 105 displays a message 903 showing the telephone number of the reply destination and a message 904 of "Please confirm a reply destination and press "Yes" if it is correct." on the operation-display unit 231. When the user inputs a message 905 of "Yes", the MFP 101 starts the reply process.

Figure 10:
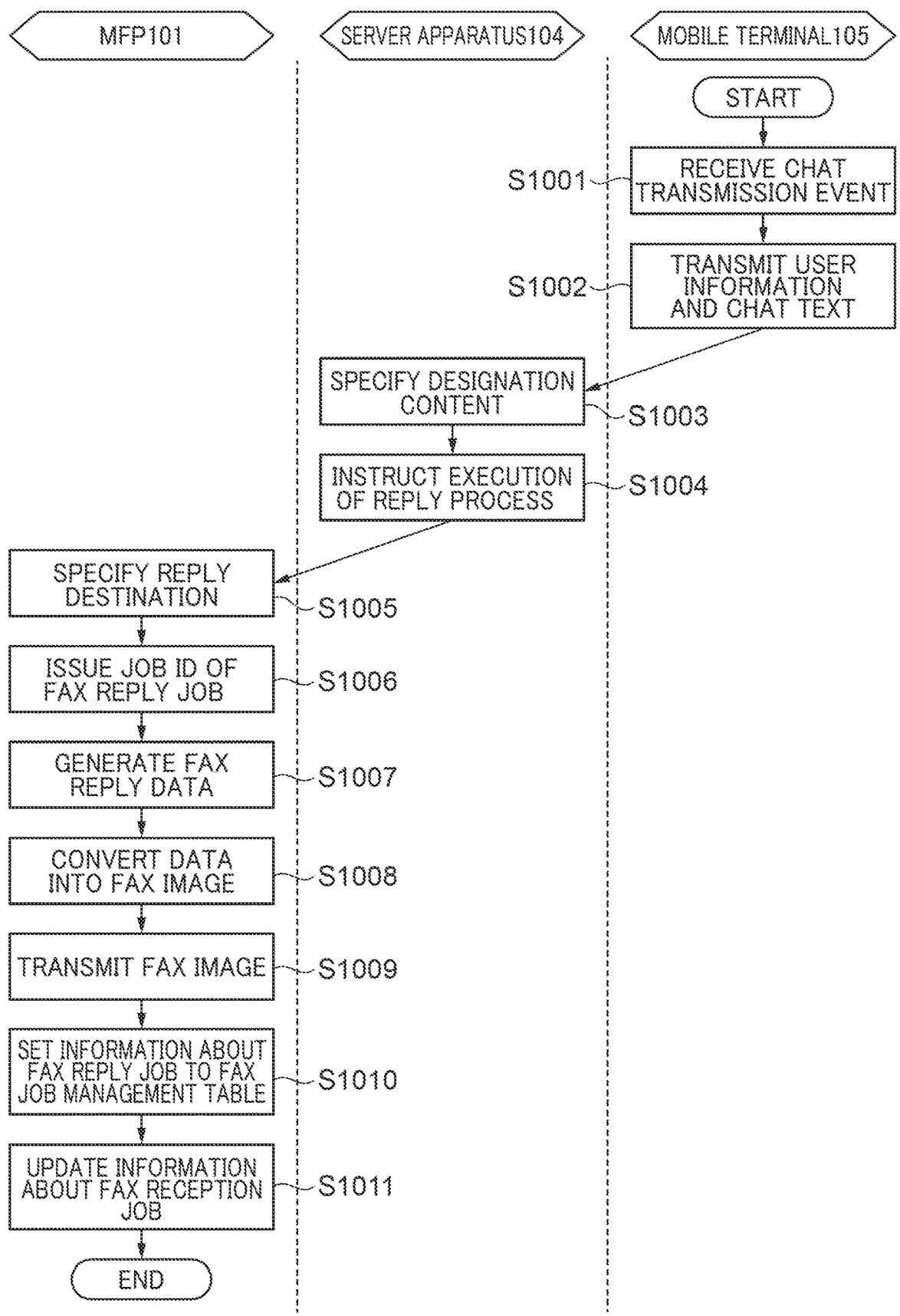
FIG. 10 is a sequence chart showing procedures of a reply control process in the embodiment.

FIG. 10 is a sequence chart showing procedures of a reply control process in the embodiment. The reply control processes in FIG. 10 is also executed by the MFP 101, server apparatus 104, and mobile terminal 105 that constitute the information processing system 100. The process by the MFP 101 is achieved by executing a program stored in the ROM 203 etc. by the CPU 201 of the MFP 101.

The process by the server apparatus 104 is achieved by executing a program stored in the ROM 220 etc. by the CPU 218 of the server apparatus 104. The process by the mobile terminal 105 is achieved by executing a program stored in the ROM 227 etc. by the CPU 225 of the mobile terminal 105.

The reply control process in FIG. 10 is executed when the user inputs a message (for example, the message 905 in FIG. 9B) that instructs to start the reply process to the operation-display unit 231. When the user inputs the message that instructs to start the reply process to the operation-display unit 231, the UI operation information obtaining module 512 of the mobile application 510 outputs a chat transmission event of the user to the main control module 511.

In FIG. 10, the main control module 511 of the mobile application 510 of the mobile terminal 105 receives the chat transmission event of the user from the UI operation information obtaining module 512 in a step S1001 first. In the next step S1002, the CPU 225 of the mobile terminal 105 transmits the user information about the logged-in user and the chat text including "Please reply" and "Yes" to the server apparatus 104.

In a step S1003, the CPU 218 of the server apparatus 104 specifies an instruction content on the basis of the chat text received from the mobile terminal 105. Next, the CPU 218 instructs to execute the reply process to the MFP 101 in a step S1004. Moreover, the CPU 218 transmits the FAX bibliographic information 704 at the time of the FAX reception and the user information to the MFP 101.

In a step S1005, the CPU 201 of the MFP 101 specifies the MFP 106 that is the reply destination on the basis of the FAX bibliographic information 704 at the time of the FAX reception received from the server apparatus 104. In the next step S1006, the CPU 201 issues a job ID of the FAX job corresponding to the reply process with the job processing module 301.

Figure 11:
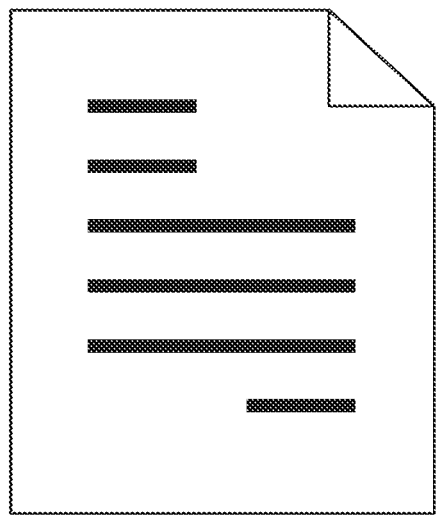
FIG. 11 is a view showing an example of FAX reply data generated in a step S1007 in FIG. 10.

In the next step S1007, the CPU 201 reads a reply template that is stored in the SSD 204 and is managed by the reply template management module 307, and generates FAX reply data 1101 in FIG. 11 on the basis of the reply template concerned. The FAX reply data 1101 is stored in the SSD 204 etc.

In the next step S1008, the CPU 201 converts the FAX reply data 1101 into the FAX image 701 with the data transmission/reception module 306. In the next step S1009, the CPU 201 performs the FAX transmission of the FAX image 701 generated in the step S1008 to the destination (i.e., the MFP 106) specified in the step S1005 with the data transmission/reception module 306.

In the next step S1010, the CPU 201 sets the information about the FAX reply job to the FAX job management table 715 with the job processing module 301. The job ID issued in the step S1006 is set to the job ID 705 of the FAX job management table 715. The Job ID of the FAX reception job included in the FAX bibliographic information 704 at the time of the FAX reception received from the server apparatus 104 is set to the FAX reception job ID 706.

In the embodiment, the FAX reception job is associated with the FAX reply job that is replied to the FAX reception job concerned in this way. The value of "FAX transmission" is set to the job type 707. The date on which the FAX image 701 is transmitted in the step S1009 is set to the transmission/reception date 708. The telephone number of the MFP 101 that transmits the FAX image 701 is set to the transmission source phone 709. The telephone number of the MFP 106 that is the reply destination specified in the step S1005 is set to the transmission destination phone 710.

The information beforehand set as the notification destination in the MFP 101 is set to the application identification information 711. The initial value of "unconfirmed" is set to the status 712. The user information transmitted in the step S1004 is set to the update user 713. The information showing the storage place of the FAX reply data 1101 generated in the step S1007 is set to the FAX data storage place 714.

In the next step S1011, the CPU 201 updates the information about the FAX reception job corresponding to the FAX bibliographic information 704 at the reception time of the FAX received from the server apparatus 104 in the FAX job management table 715 with the job processing module 301. Specifically, in the FAX job management table 715, the status 712 of the FAX reception job corresponding to the FAX bibliographic information 704 at the time of the FAX reception received from the server apparatus 104 is updated to "replied". Moreover, the update user 713 of this FAX reception job is updated by the user information transmitted in the step S1004. After that, this process is finished.

Although the configuration where the FAX reply data 1101 is unconditionally stored in the SSD 204 etc. is described in the above-mentioned process in FIG. 10, the configuration is not limited to this. For example, the MFP 101 may be provided with a measure that prompts a user to select whether the FAX reply data 1101 should be stored. In such a case, the MFP 101 may control whether the FAX reply data 1101 is stored according to this selection. Thereby, a shortage of money of the memory capacity of SSD204 by storing FAX reply data 1101 unconditionally can be reduced.

FIG. 11 is a view showing an example of the FAX reply data 1101 generated in the step S1007 in FIG. 10. The FAX reply data 1101 includes a reply message generated on the basis of a reply template set up beforehand and a part of received images, for example, an image of a first page. The reply destination apparatus, for example, the MFP 106, prints the FAX reply data 1101 on a recording sheet and outputs it. In this way, since the FAX reply data 1101 includes at least a part of the received images, a person of the reply destination is able to know that the FAX has been received safely.

Although the configuration where the reply message is generated on the basis of the reply template set up beforehand is described in the above-mentioned process in FIG. 10, the configuration is not limited to this. For example, the MFP 101 may use text that is input by the user using the chat application of the mobile terminal 105 as a reply message. Moreover, the user may change the reply template by operating the operation unit 214 of the MFP 101.

Next, the control process that displays a FAX communication data list that is list information about FAX jobs that are executed by the MFP 101 is described. FIG. 12 is a sequence chart showing procedures of a display control process for the FAX communication data list in the embodiment. The display control process for the FAX communication data list in FIG. 12 is also executed by the MFP 101, server apparatus 104, and mobile terminal 105 that constitute the information processing system 100.

The process by the MFP 101 is achieved by executing a program stored in the ROM 203 etc. by the CPU 201 of the MFP 101. The process by the server apparatus 104 is achieved by executing a program stored in the ROM 220 etc. by the CPU 218 of the server apparatus 104. The process by the mobile terminal 105 is achieved by executing a program stored in the ROM 227 etc. by the CPU 225 of the mobile terminal 105.

The display control process for the FAX communication data list in FIG. 12 is executed when the user selects the FAX communication data list button 602 in the mobile terminal screen 600. When the selection of the FAX communication data list button 602 by the user is detected, the UI operation information obtaining module 512 of the mobile application 510 of the mobile terminal 105 outputs a display instruction event for the FAX job list to the main control module 511.

In FIG. 12, the main control module 511 of the mobile application 510 of the mobile terminal 105 receives the display instruction event for the FAX communication data list from the UI operation information obtaining module 512 in a step S1201 first. In the next step S1202, the CPU 225 of the mobile terminal instructs the server apparatus 104 to transmit data relevant to the FAX communication data list.

When receiving the transmission instruction, the CPU 218 of the server apparatus 104 instructs the MFP 101 to transmit the data relevant to the FAX communication data list in a step S1203. When receiving the transmission instruction, the CPU 201 of the MFP 101 transmits the FAX job management table 715 to the server apparatus 104 in a step S1204. In the next step S1205, the CPU 218 of the server apparatus 104 transmits the FAX job management table 715 obtained from the MFP 101 to the mobile terminal 105.

In the next step S1206, the mobile application 510 of the mobile terminal 105 controls the information display module 516 to display the FAX communication data list screen 1300 in FIG. 13 on the operation-display unit 231 of the mobile terminal 105 on the basis of the FAX job management table 715. And then, this process is finished.

Figure 13A:
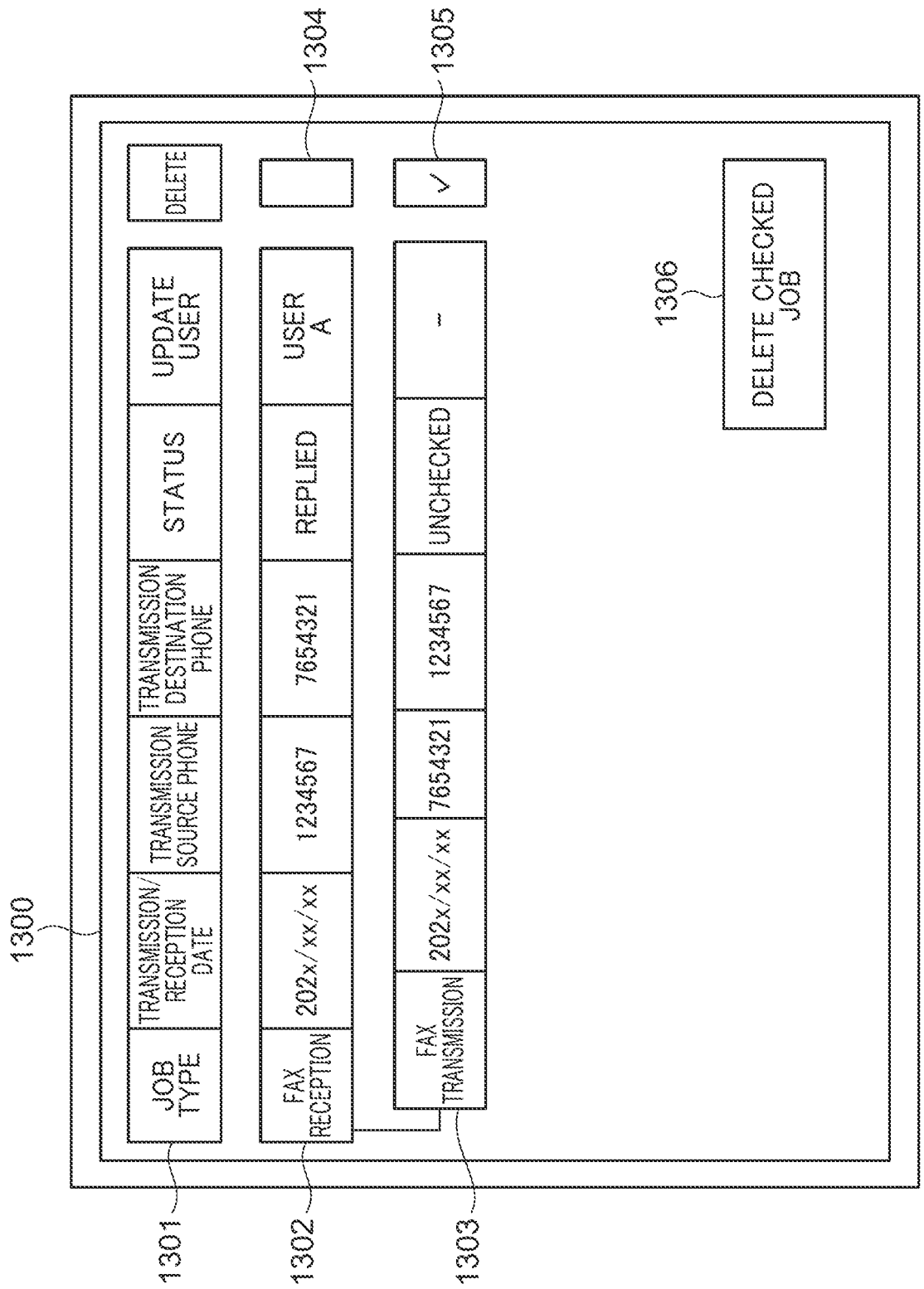
FIG. 13A and FIG. 13B are views showing examples of FAX communication data list screens displayed on the operation-display unit in a step S1206 in FIG. 12.
Figure 13B:
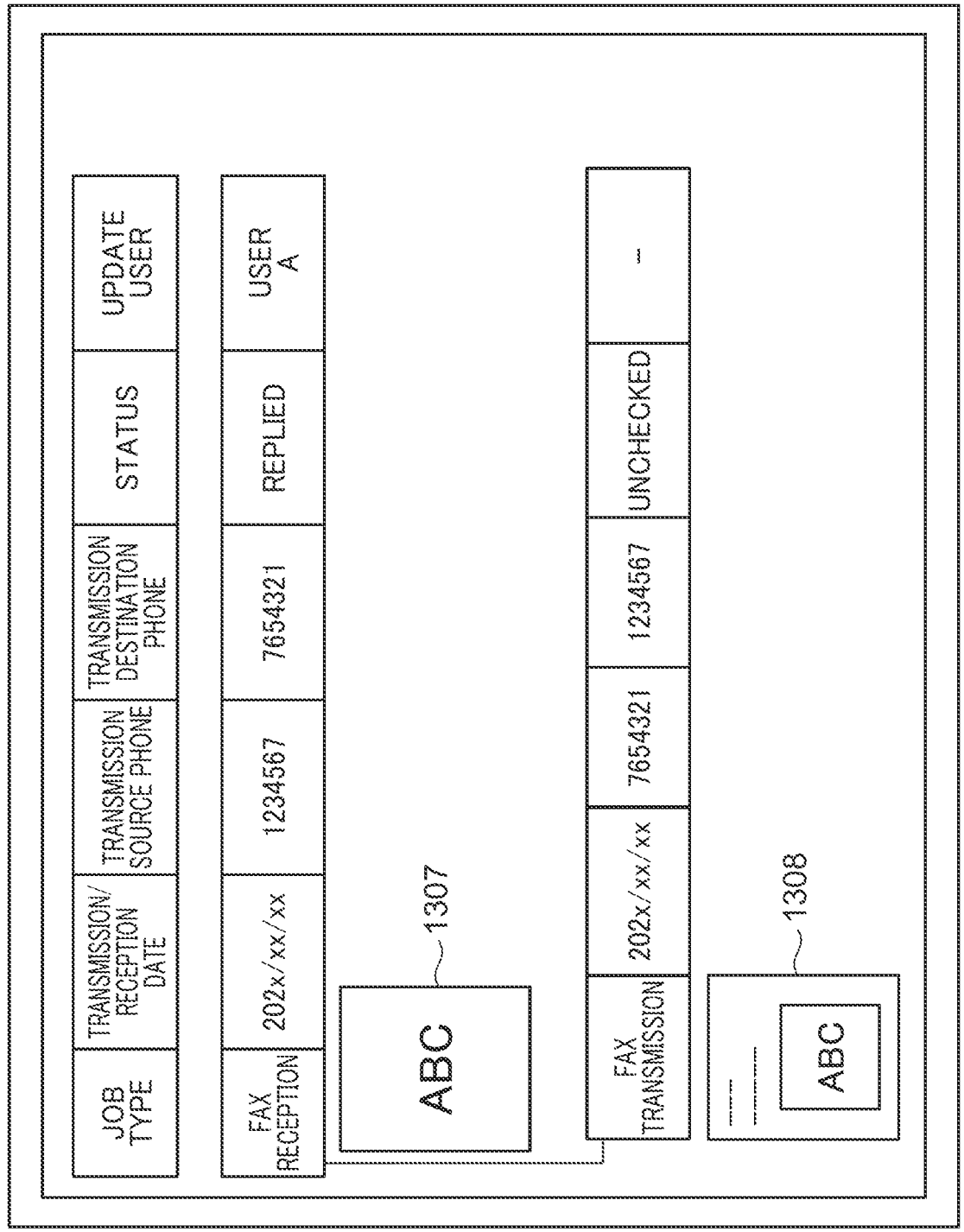

FIG. 13A and FIG. 13B are views showing examples of FAX communication data list screens 1300 displayed on the operation-display unit 231 in the step S1206 in FIG. 12. In the FAX communication data list screen 1300 in FIG. 13A, the information about the FAX job executed by the MFP 101 is displayed on the basis of the information included in the FAX job management table 715 transmitted from the MFP 101.

As shown in FIG. 13A, information 1302 about the FAX reception job that receives the FAX image 701 from the MFP 106 and information 1303 about the FAX reply job that replies to the MFP 106 are displayed by a tree structure. Thereby, the user can easily grasp the relation between the information 1302 about the FAX reception job and the information 1303 about the FAX reply job. It should be noted that the display method of these pieces of information is not limited to the tree structure. Another display method that can show the relation may be employed.

In a title line 1301 of the FAX communication data list screen 1300 shown in FIG. 13A, items corresponding to the job type 707, the transmission/reception date 708, the transmission source phone 709, the transmission destination phone 710, the status 712, and the update user 713 in the FAX job management table 715 are displayed.

In the embodiment, the FAX communication data list screen 1300 including the status information about the FAX reception job managed by the FAX job management table 715 is displayed on the operation-display unit 231 of the mobile terminal 105 in this way. Accordingly, the user is able to grasp the processing status of the image data easily.

Moreover, in the embodiment, the FAX communication data list screen 1300 that associates the information 1302 about the FAX reception job with the information 1303 about the FAX reply job is displayed on the operation-display unit 231 of the mobile terminal 105 on the basis of the FAX job management table 715. The FAX communication data list screen 1300 includes the status information about the FAX reception job and the status information about the FAX reply job. Thereby, the user can easily grasp that the reply to the data received by the FAX reception job has been performed.

For example, when the FAX communication data list screen 1300 is displayed with the contents shown in FIG. 13A, the user can grasp that the FAX reply job to the FAX reception job has been executed by an instruction from a user A who is an update user.

Moreover, a measure to delete the information about a job is provided in the FAX communication data list screen 1300. When the user checks at least one of deletion check boxes 1304 and 1305 and selects a delete button 1306, the FAX data operation module 513 instructs the MFP 101 to delete the information about the checked job(s) through the server apparatus 104.

Pieces of related information may be operated collectively. For example, when the deletion check box 1304 of the FAX reception job is checked, the deletion check box 1305 of the FAX reply job associated with the FAX reception job concerned may be automatically checked. Thereby, the user can easily instruct deletion of the data that becomes unnecessary because the processing status has been grasped.

Moreover, FAX data and FAX reply data may be displayed on the FAX communication data list screen 1300 in addition to the information about the jobs. For example, when the user taps the display area of the information 1302 about the FAX reception job, the FAX data generated in the FAX reception job may be displayed on the vicinity. Moreover, when the user taps a detail display button (not shown), FAX data 1307 generated in the FAX reception job and FAX reply data 1308 generated in the FAX reply job are displayed as shown in FIG. 13B.

The FAX data 1307 is displayed near the information 1302 about the FAX reception job. And the FAX reply data 1308 is displayed near the information 1303 about the FAX reply job. In this way, the FAX data and FAX reply data that are generated by the jobs are displayed in association with the information about the jobs on the FAX communication data list screen 1300. Thereby, the user can confirm the content of the data of the FAX reception and the content of data of the FAX reply from the FAX communication data list screen 1300.

Next, a FAX data display control process that displays the FAX data 1307 and FAX reply data 1308 on the FAX communication data list screen 1300 will be described.

Figure 14:
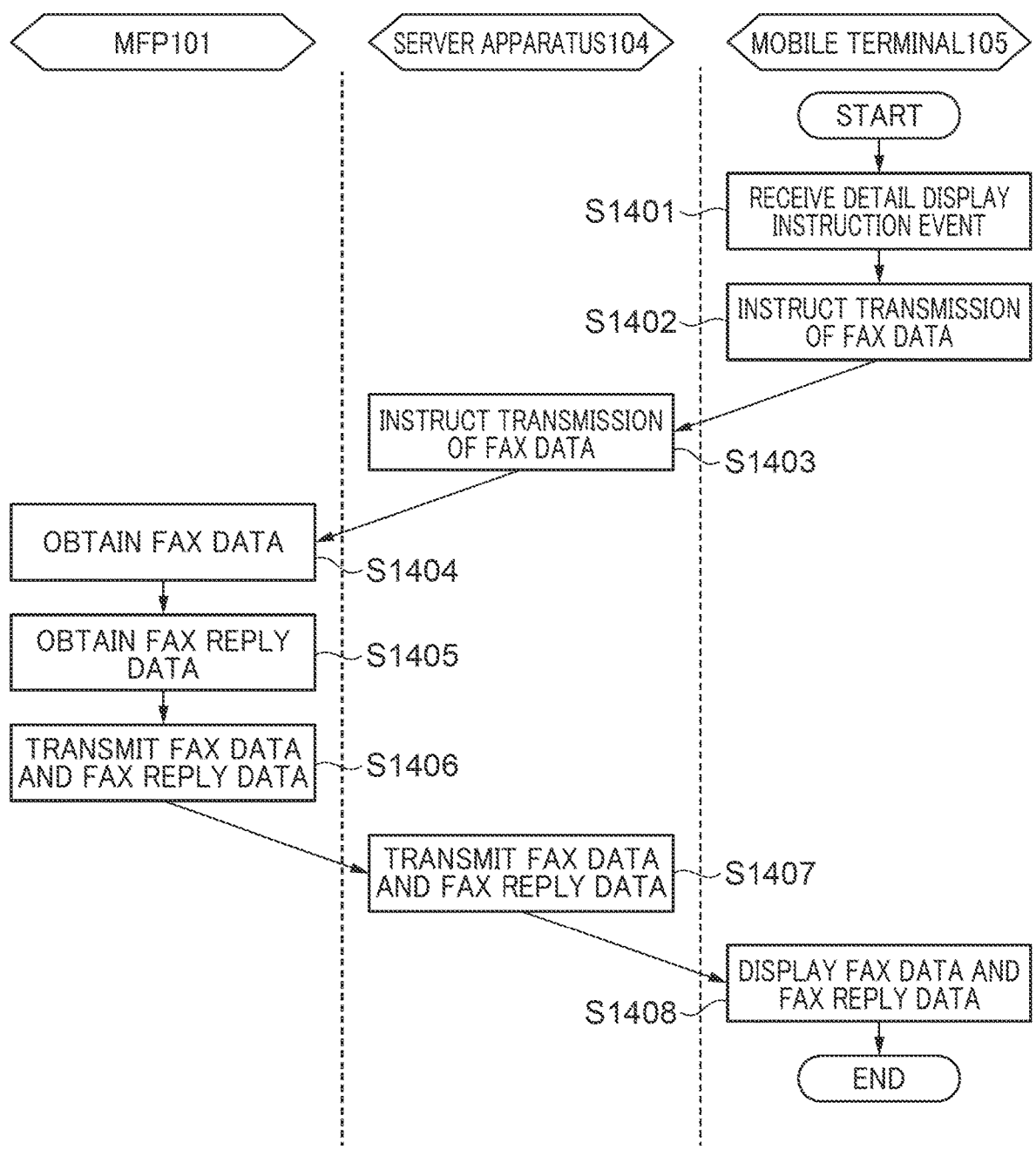
FIG. 14 is a sequence chart showing procedures of a FAX data display control process in the embodiment.

FIG. 14 is a sequence chart showing procedures of the FAX data display control process in the embodiment. The FAX data display control process in FIG. 14 is also executed by the MFP 101, server apparatus 104, and mobile terminal 105 that constitute the information processing system 100. The process by the MFP 101 is achieved by executing a program stored in the ROM 203 etc. by the CPU 201 of the MFP 101. The process by the server apparatus 104 is achieved by executing a program stored in the ROM 220 etc. by the CPU 218 of the server apparatus 104. The process by the mobile terminal 105 is achieved by executing a program stored in the ROM 227 etc. by the CPU 225 of the mobile terminal 105.

The FAX data display control process in FIG. 14 is executed when the UI operation information obtaining module 512 of the mobile application 510 of the mobile terminal 105 detects a tap of the above-mentioned detail display button by a user or a tap of the display area of the information 1302 or 1303 about the FAX reception/transmission job by a user. When such a tap operation by the user is detected, the UI operation information obtaining module 512 outputs a detail display instruction event of the FAX communication data list to the main control module 511 of the mobile application 510.

In FIG. 14, the main control module 511 of the mobile application 510 of the mobile terminal 105 receives the detail display instruction event of the FAX communication data list from the UI operation information obtaining module 512 in a step S1401. In the next step S1402, the main control module 511 instructs the server apparatus 104 to transmit the FAX data by designating the job ID of the job subjected to the detail display. It should be noted that the job ID is specified on the basis of the FAX job management table 715 transmitted from the server apparatus 104 in the step S1205.

When receiving the transmission instruction, the CPU 218 of the server apparatus 104 instructs the MFP 101 to transmit the FAX data of the designated job ID in a step S1403. When receiving the transmission instruction, the CPU 201 of the MFP 101 obtains the FAX data of the designated job ID from the storage place on the basis of the FAX job management table 715.

In the next step S1405, the CPU 201 specifies a job of which the FAX reception job ID matches the designated job ID on the basis of FAX job management table 715, and obtains the FAX reply data generated by the specified job from the storage place. That is, in the embodiment, when the FAX reply job is associated with the FAX reception job in the FAX job management table 715, the FAX reply data generated by the FAX reply job concerned is obtained in the step S1405.

In the next step S1406, the CPU 201 transmits the FAX data obtained in the step S1404 and the FAX reply data obtained in the step S1405 to the server apparatus 104. When receiving these data, the CPU 218 of the server apparatus 104 transmits the FAX data and FAX reply data obtained from the MFP 101 to the mobile terminal 105 in a step S1407.

When receiving these data, the mobile application 510 of the mobile terminal 105 displays the received FAX data and FAX reception data on the FAX communication data list screen 1300 in a step S1408 with the information display module 516. And then, this process is finished.

It should be noted that a user can change the configuration of the FAX communication data list screen 1300 in the embodiment.

Figure 15B:
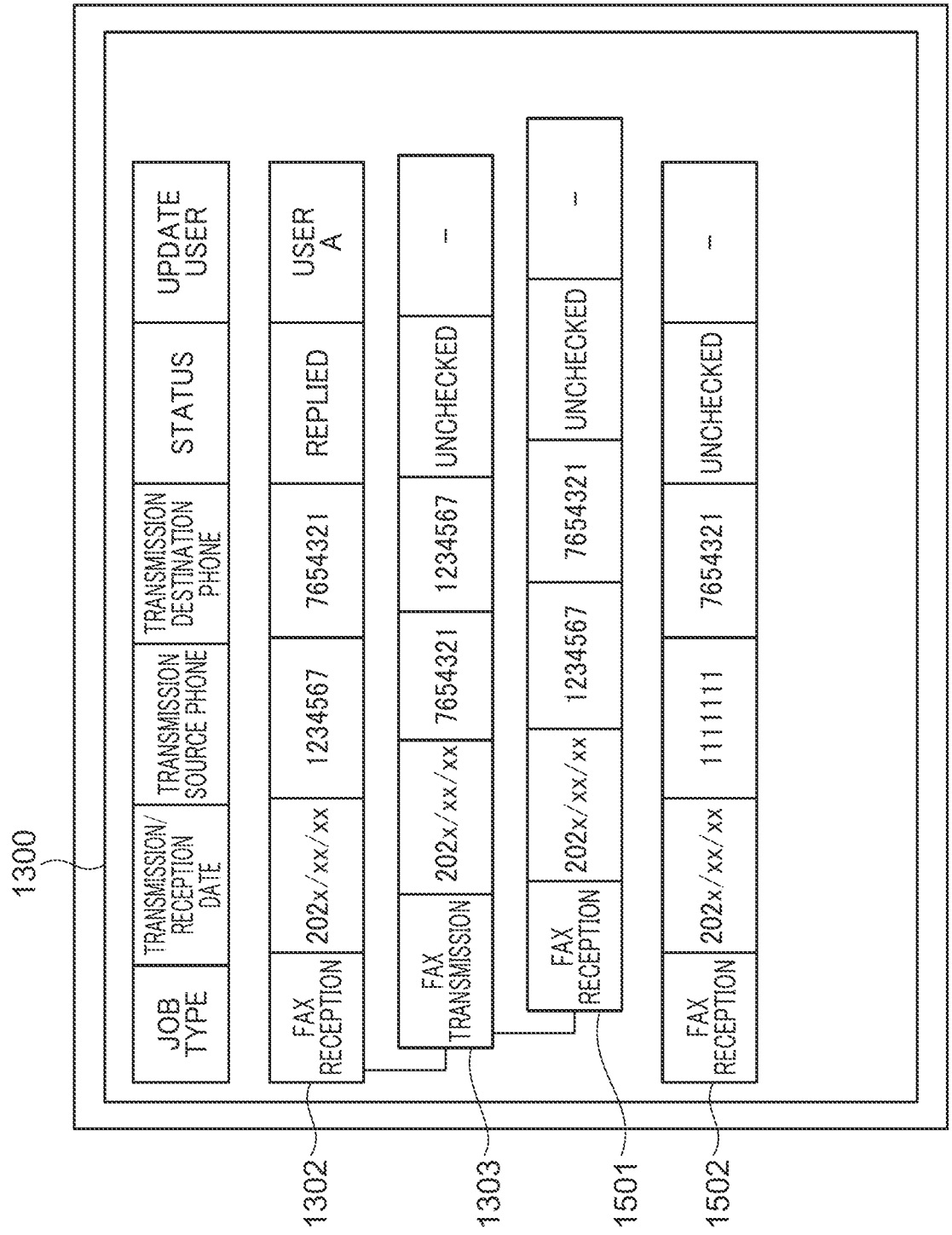

FIG. 15A and FIG. 15B are views describing an operation method that changes the configuration of the FAX communication data list screen 1300 in FIG. 13A.

FIG. 15A shows an example where information 1501 about a FAX reception job and information 1502 about a FAX reception job are displayed on the FAX communication data list screen 1300 in addition to the information 1302 about the FAX reception job and the information 1303 about the FAX reply job.

The information 1302 about the FAX reception job and the information 1303 about the FAX reply job are displayed by the tree structure showing the relation as mentioned above. The information 1501 about the FAX reception job may be relevant to the information 1303 about the FAX reply job. For example, the information 1501 about the FAX reception job may be the information about the FAX reception job that receives the FAX image transmitted as the reply to the information 1303 about the FAX reply job.

In such a case, the user moves the display area of the information 1501 about the FAX reception job to the display area of the information 1303 about the FAX reply job by a drag operation. This incorporates the information 1501 about the FAX reception job into the above-mentioned tree structure as shown in FIG. 15B.

That is, the relation between the information 1303 about the FAX reply job and the information 1501 about the FAX reception job can be changed according to the instruction by the user. Thereby, the user can intelligibly display the relation between the information 1303 about the FAX reply job and the information 1501 about the FAX reception job.

When the above-mentioned drag operation is performed, the FAX data operation module 513 of the mobile terminal 105 instructs the MFP 101 to update the FAX reception job ID 706 corresponding to the information 1501 about the FAX reception job in the FAX job management table 715 through the server apparatus 104.

Moreover, a plurality of users can confirm the FAX communication data list using the respective mobile terminals in the embodiment. How to notify the respective mobile terminals of the update of the status 712 will be described.

Figure 16:
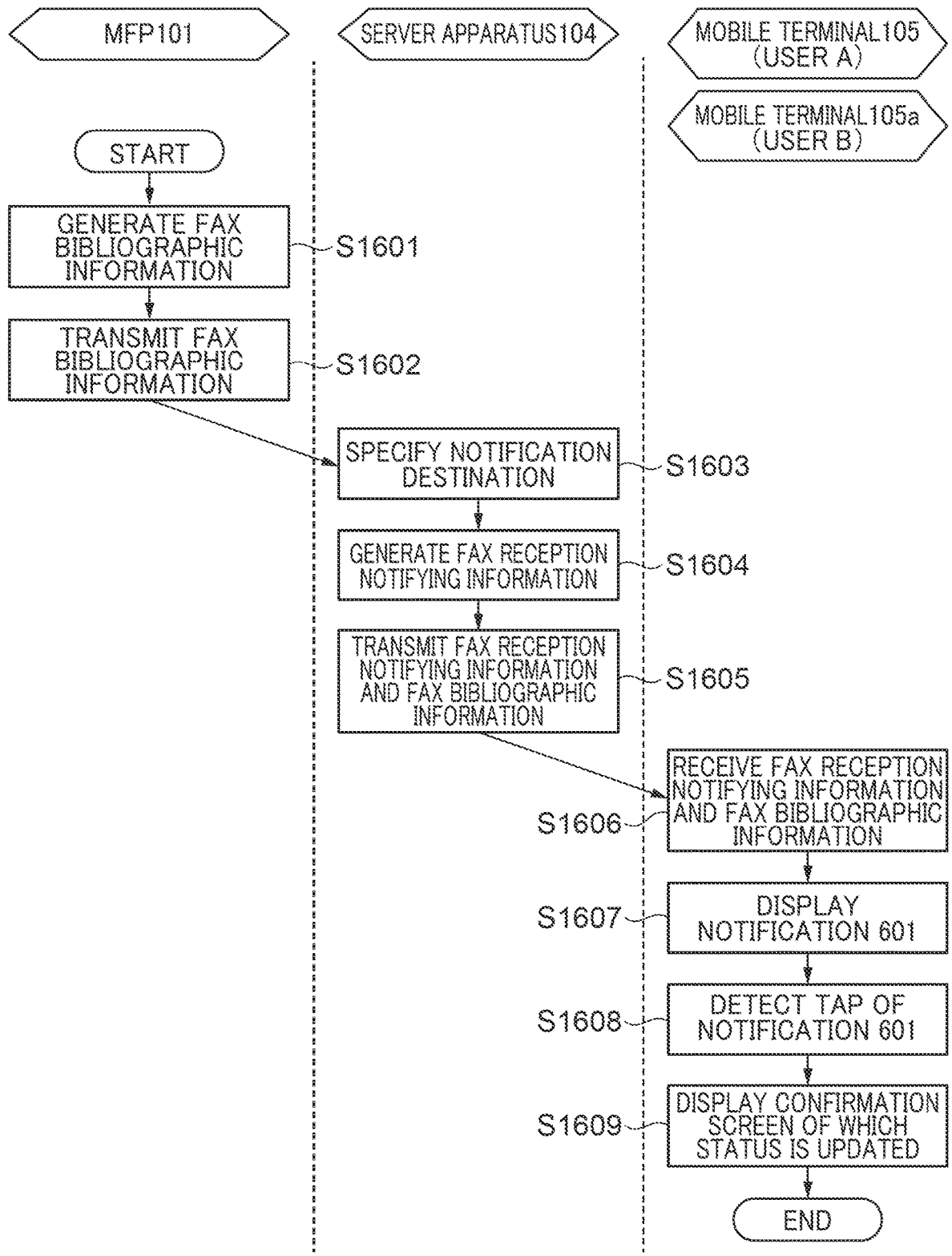
FIG. 16 is a sequence chart showing procedures of an update notification process for a status in the embodiment.

FIG. 16 is a sequence chart showing procedures of an update notification process for the status 712 in the embodiment. The update notification process in FIG. 16 is also executed by the MFP 101, server apparatus 104, and mobile terminal 105 that constitute the information processing system 100.

The process by the MFP 101 is achieved by executing a program stored in the ROM 203 etc. by the CPU 201 of the MFP 101. The process by the server apparatus 104 is achieved by executing a program stored in the ROM 220 etc. by the CPU 218 of the server apparatus 104. The process by the mobile terminal 105 is achieved by executing a program stored in the ROM 227 etc. by the CPU 225 of the mobile terminal 105.

The updated notification process in FIG. 16 is executed when the FAX job management table 715 is updated. FIG. 16 shows what kind of notification reaches the mobile terminal 105 held by a user A and a mobile terminal 105a held by a user B when the user A inputs a message 905 from the mobile terminal 105 and the reply control process in FIG. 10 is executed.

It should be noted that the mobile terminal 105a has functions and configurations similar to the mobile terminal 105. Hereinafter, a component of the mobile terminal 105a is indicated by a reference numeral to which "a" is added to a reference numeral of a corresponding component of the mobile terminal 105. In FIG. 16, the reply control process in FIG. 10 shall be executed, and the information about a FAX reception job of which a job ID is "AAAA" in the FAX job management table 715 shall be updated by the process in the step S1011. Specifically, the status 712 shall be updated to "replied" and the update user 713 shall be updated to "user A" from among the information about the FAX reception job concerned.

In a step S1601 in FIG. 16, the CPU 201 of the MFP 101 generates the FAX bibliographic information 704 on the basis of the information about the FAX reception job updated in the step S1011. A mobile terminal identifier that identifies the mobile terminal 105 held by the user A and an application identifier that identifies the mobile application 510 of the mobile terminal 105 are set to the application identification information 711 of the FAX bibliographic information 704. Moreover, a mobile terminal identifier that identifies the mobile terminal 105a held by the user B and an application identifier that identifies the mobile application 510a of the mobile terminal 105a are set to the application identification information 711 of the FAX bibliographic information 704.

Next, the CPU 201 is connected to the server apparatus 104 with the job processing module 301. In the next step S1602, the CPU 201 transmits the generated FAX bibliographic information 704 to the server apparatus 104.

In the next step S1603, the CPU 218 of the server apparatus 104 specifies a mobile terminal that is a notification destination on the basis of the application identification information 711 in the FAX bibliographic information 704 received from the MFP 101. Specifically, the CPU 218 specifies the mobile terminal 105 held by the user A and the mobile terminal 105a held by the user B.

In the next step S1604, the CPU 218 generates the FAX reception notification information for displaying a message showing that the status is updated as the notification 601 on the basis of the FAX bibliographic information 704. The CPU 218 determines that the notification is the status update notification but is not the FAX reception notification because only the FAX bibliographic information 704 is received from the MFP 101 instead of the FAX communication data 702 including the FAX data 703.

In the next step S1605, the CPU 218 transmits the FAX reception notification information and FAX bibliographic information 704 to the mobile terminals 105 and 105a that are the notification destinations specified in the step S1603.

In the next step S1606, the CPU 225 of the mobile terminal 105 and the CPU 225a of the mobile terminal 105a receive the FAX reception notification information and FAX bibliographic information 704 from the server apparatus 104, respectively. Since the mobile terminal 105 and the mobile terminal 105a perform similar processes, the process executed by the mobile terminal 105 is described hereinafter as an example.

Next, the CPU 225 of the mobile terminal 105 specifies the mobile application 510 from the application identification information 711 in the received FAX bibliographic information 704 and outputs the FAX reception notification information to the mobile application 510.

In the next step S1607, the mobile application 510 displays the notification 601 on the operation-display unit 231 of the mobile terminal 105 on the basis of the received FAX reception notification information with the information display module 516. For example, a message showing that the status is updated is displayed in the notification 601. In the next step S1608, the UI operation information obtaining module 512 of the mobile application 510 detects a tap of the notification 601 by the user. When detecting the tap of the notification 601, the UI operation information obtaining module 512 notifies the main control module 511 of a display instruction of a confirmation screen in which the status is updated.

Figure 17A:
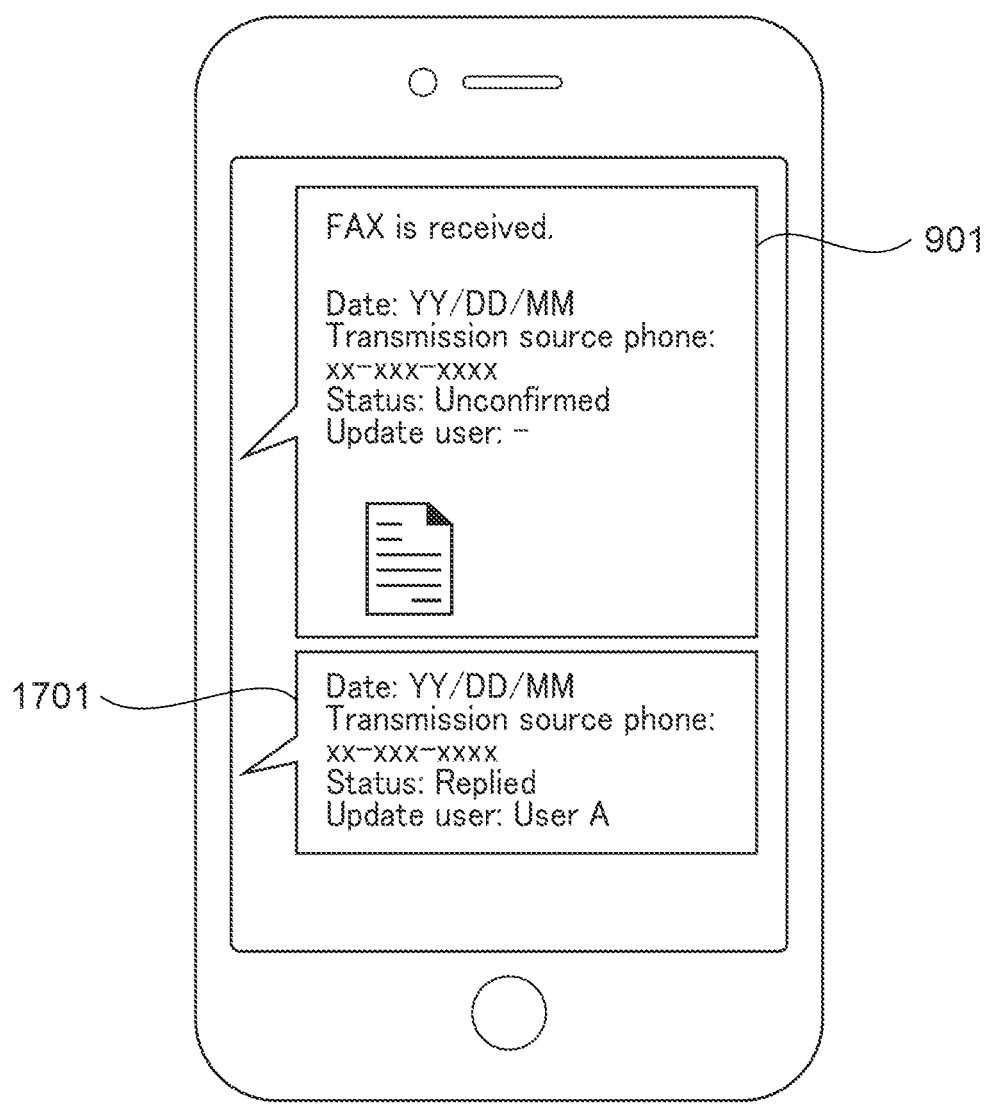
FIG. 17A and FIG. 17B are views showing example of screens displayed on the operation-display unit in FIG. 2C.

In the next step S1609, the CPU 225 of the mobile terminal 105 displays the confirmation screen in FIG. 17A in which the status is updated on the operation-display unit 231 with the information display module 516. And then, this process is finished.

Figure 17B:
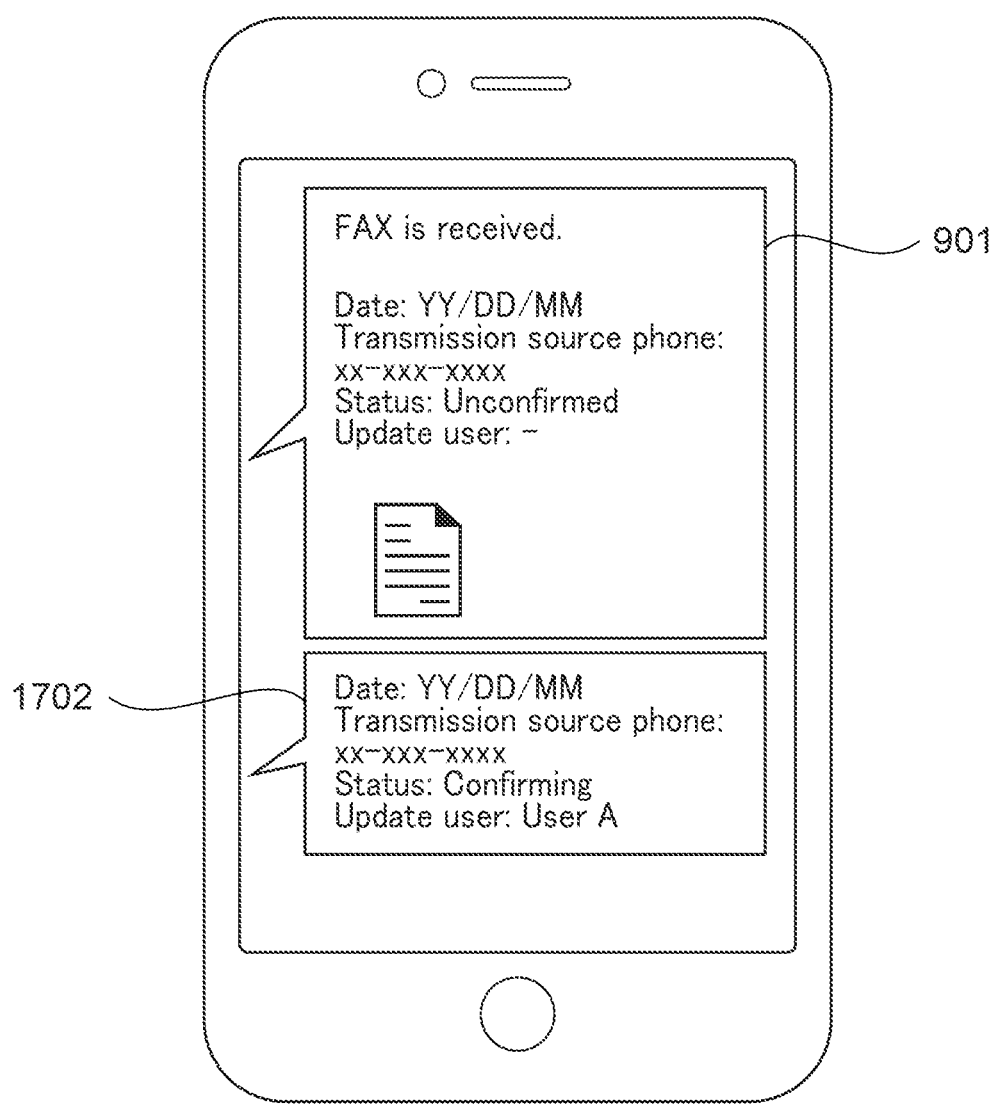

FIG. 17A and FIG. 17B are views showing examples of screens displayed on the operation-display unit 231 in FIG. 2C. FIG. 17A is the view showing an example of a confirmation screen displayed on the operation-display unit 231 of the mobile terminal 105 and the operation-display unit 231a of the mobile terminal 105a in the step S1609. A message 1701 in which the status is set to "replied" and the update user is set to "user A" is displayed on the confirmation screen in FIG. 17A. Since the message 1701 is displayed on the confirmation screen, the user B can grasp that the reply to the FAX reception job has been performed by the instruction from the user A. The message 1701 includes information (Status: Replied) showing that the reply to the image data is completed and is displayed at a position that does not overlap with the message 901 that includes the image data.

Moreover, the status 712 in the FAX job management table 715 can be changed by a user's instruction in the embodiment. Hereinafter, the configuration that changes the status 712 using the chat function will be described as an example. Since the configuration that accepts an update instruction for the status 712 using the chat function is employed in this way, a user can instruct the update of the status 712 by an operation method similar to the execution instruction of the reply process.

Figure 18:
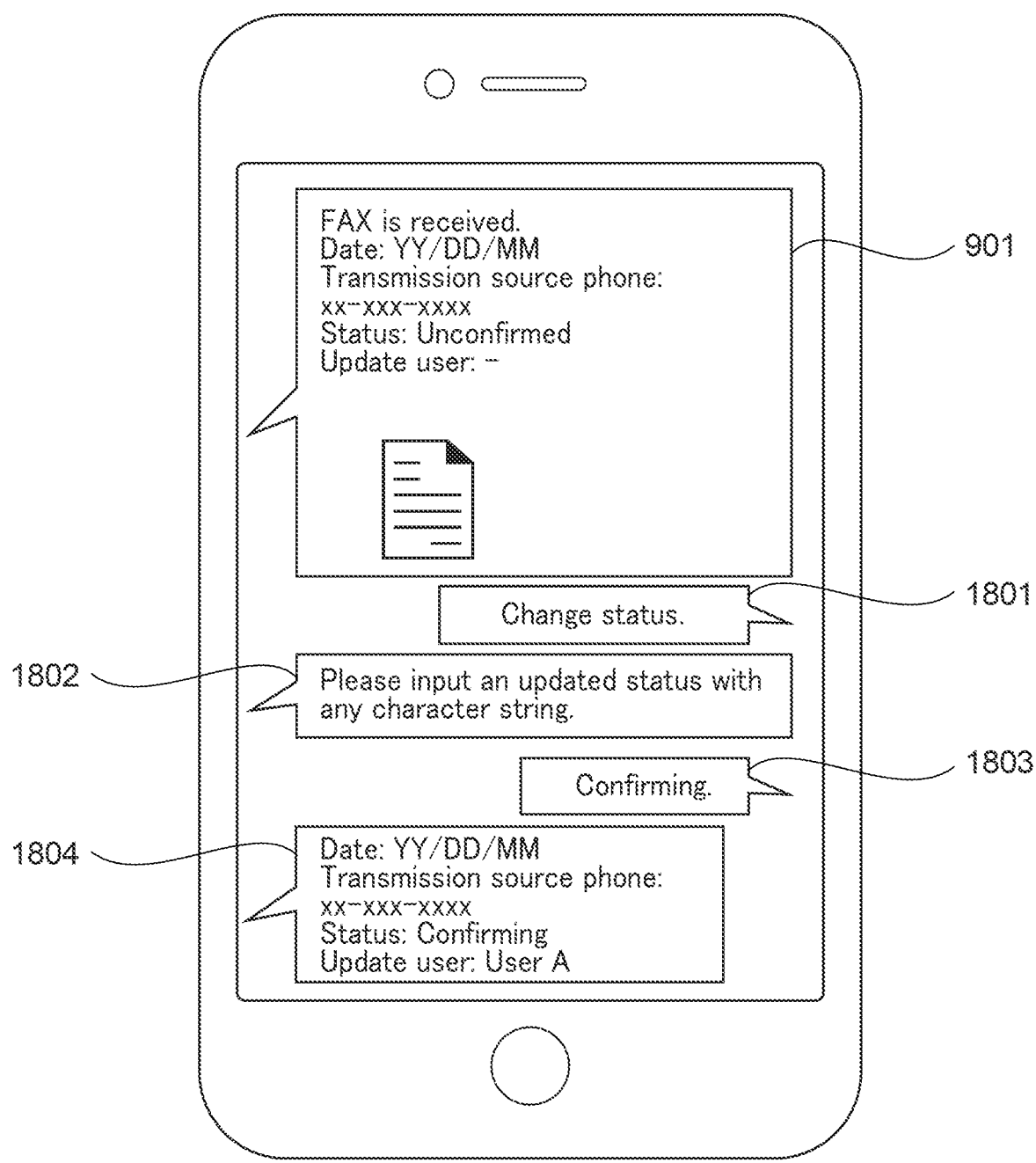
FIG. 18 is a view showing an example of a confirmation screen displayed on the operation-display unit in FIG. 2C.

For example, when the user inputs a character string of "change status" to the operation-display unit 231 of the mobile terminal 105 in a state where the confirmation screen in FIG. 9A is displayed on the operation-display unit 231 of the mobile terminal 105, a message 1801 is displayed on the above-mentioned confirmation screen as shown in FIG. 18. Moreover, the mobile terminal 105 transmits the text data of the message 1801 to the server apparatus 104.

The dialog processing module 403 of the server apparatus 104 that receives the text data recognizes the text data as an instruction of the change process for the status from the character strings of "status" and "change", and transmits text data of a message that prompts a user to input the status to the mobile terminal 105. The mobile terminal 105 displays a message 1802 of "Please input an updated status with any character strings." on the above-mentioned confirmation screen on the basis of the received text data. After that, when the user inputs a character string of "confirming" to the operation-display unit 231, a message 1803 is displayed on the above-mentioned confirmation screen as shown in FIG. 18. And the text data of the message 1803 is transmitted to the server apparatus 104.

The server apparatus 104 changes the status 712 of the job concerned in the FAX bibliographic information 704 to "confirming", and changes the update user 713 to the name of the user who operates the mobile terminal 105, for example, changes to "user A". After that, the server apparatus 104 transmits the changed FAX bibliographic information 704 to the mobile terminal 105 and the MFP 101.

When receiving the FAX bibliographic information 704, the MFP 101 updates the FAX job management table 715. Specifically, the MFP 101 changes the status 712 of the job corresponding to the received FAX bibliographic information 704 in the FAX job management table 715 to "confirming", and changes the update user 713 to "user A".

In the meantime, when receiving the FAX bibliographic information 704, the mobile terminal 105 displays information 1804 in which the status and update user are updated on the basis of the FAX bibliographic information 704 concerned.

Figure 19:
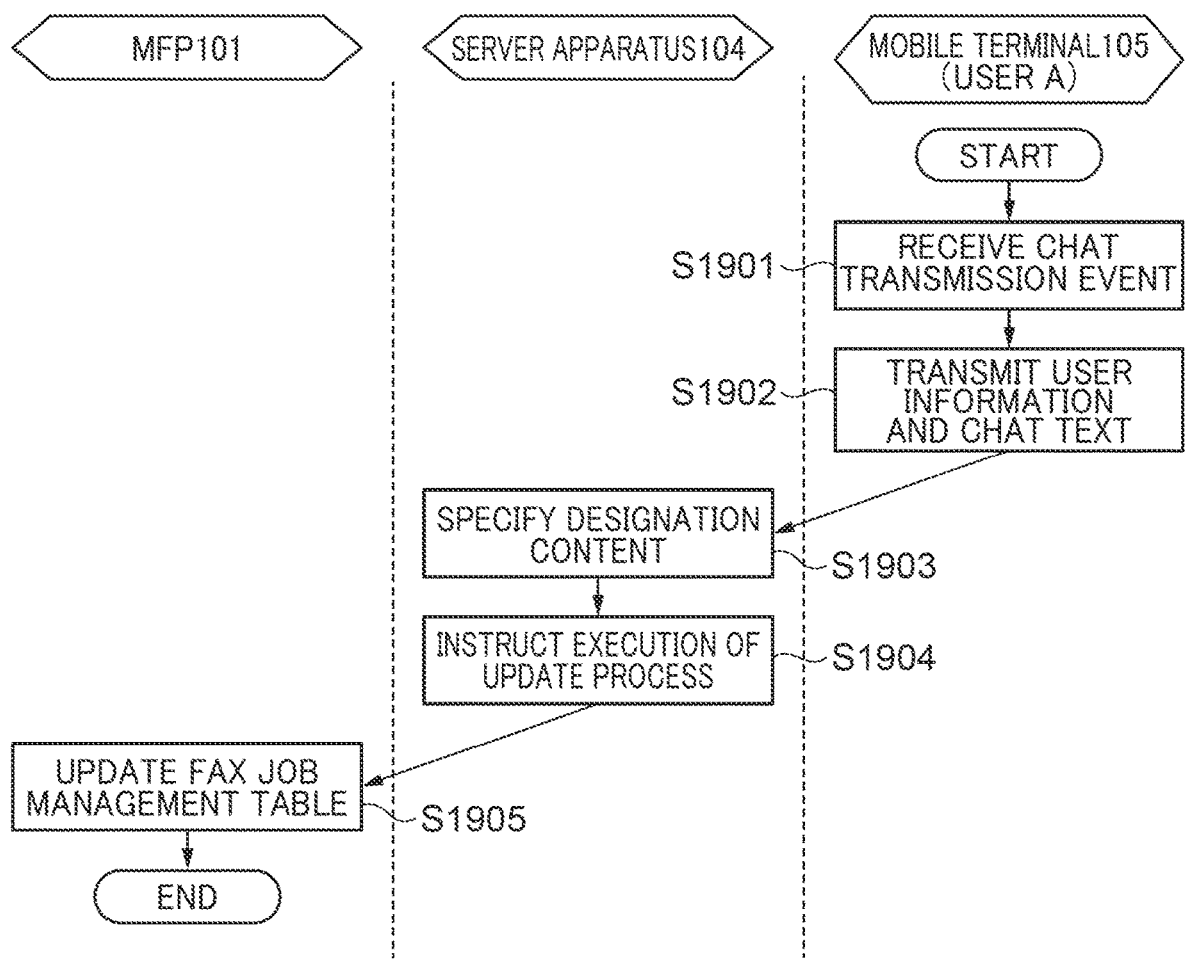
FIG. 19 is a sequence chart showing procedures of a status change process by a user in the embodiment.

FIG. 19 is a sequence chart showing procedures of a status change process by a user in the embodiment. The status change process in FIG. 19 is also executed by the MFP 101, server apparatus 104, and mobile terminal 105 that constitute the information processing system 100. The process by the MFP 101 is achieved by executing a program stored in the ROM 203 etc. by the CPU 201 of the MFP 101. The process by the server apparatus 104 is achieved by executing a program stored in the ROM 220 etc. by the CPU 218 of the server apparatus 104. The process by the mobile terminal 105 is achieved by executing a program stored in the ROM 227 etc. by the CPU 225 of the mobile terminal 105.

The status change process in FIG. 19 is executed when a user instructs to change the status. In FIG. 19, the user A shall input a character string of "please change status" that instructs to change the status on the above-mentioned confirmation screen displayed on the operation-display unit 231 of the mobile terminal 105. Moreover, the character string of "confirming" shall be input as the status after change. When the user A inputs such a character string, the UI operation information obtaining module 512 of the mobile application 510 of the mobile terminal 105 outputs a user's chat transmission event to the main control module 511.

In FIG. 19, the main control module 511 of the mobile application 510 of the mobile terminal 105 receives the chat transmission event of the user from the UI operation information obtaining module 512 in a step S1901 first. In the next step S1902, the CPU 225 of the mobile terminal 105 transmits the user information about the logged-in user and the chat text including "please change status" or "confirming" to the server apparatus 104.

In a step S1903, the CPU 218 of the server apparatus 104 specifies an instruction content on the basis of the chat text received from the mobile terminal 105. Specifically, the CPU 218 specifies the chat text as an instruction of the status change process from the character strings of "status" and "change" included in the received chat text. Next, the CPU 218 instructs to execute the status change process to the MFP 101 in a step S1904. Moreover, the CPU 218 transmits the FAX bibliographic information 704 at the time of the FAX reception and the user information to the MFP 101.

When receiving the execution instruction, the CPU 201 of the MFP 101 specifies a target job from among a plurality of jobs managed by the FAX job management table 715 on the basis of the FAX bibliographic information 704 received from the server apparatus 104. In the next step S1905, the CPU 201 updates the information about the job specified in the FAX job management table 715 with the job processing module 301.

Specifically, the status 712 is changed to "confirming" input by the user A and the update user 713 is changed to "user A" from among the information about the job specified in the FAX job management table 715. After that, this process is finished and the updated notification process in FIG. 16 mentioned above is executed.

Thereby, the notification 601 showing that the status is updated is displayed on the operation-display unit 231a of the mobile terminal 105a held by the user B, for example. When the user B taps the notification 601, the confirmation screen in FIG. 17B is displayed on the operation-display unit 231a. In the confirmation screen, a message 1702 in which the status is set to "confirming" and the update user is set to "user A" is displayed. Since the message 1702 is displayed on the confirmation screen, the user B can grasp that the status of the FAX reception job has been updated to "confirming" by the instruction from the user A.

Next, the update of the status 712 in a case where a user instructs the MFP 101 to reply the FAX by operating the operation unit 214 will be described.

Figure 20:
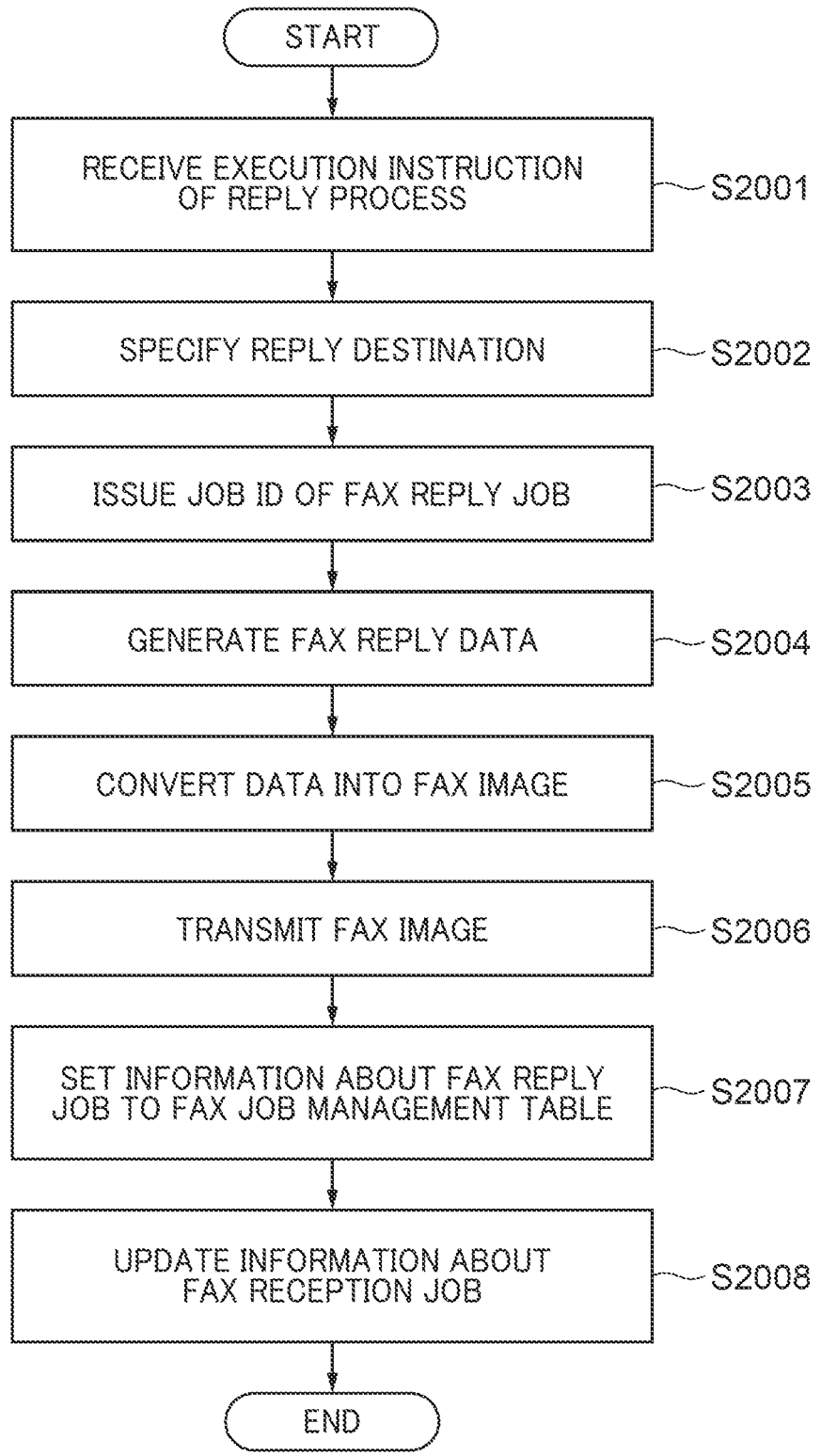
FIG. 20 is a flowchart showing procedures of an update process for a FAX job management table in the embodiment.

FIG. 20 is a flowchart showing procedures of an update process for the FAX job management table 715 in the embodiment. The update process in FIG. 20 is executed by the MFP 101 that constitutes the information processing system 100. The process by the MFP 101 is achieved by executing a program stored in the ROM 203 etc. by the CPU 201 of the MFP 101. In the update process in FIG. 20, the FAX communication data list screen 1300 in FIG. 13A shall be displayed on the operation unit 214 of the MFP 101.

As shown in FIG. 20, the CPU 201 accepts an execution instruction for the reply process by a user. For example, the user selects a FAX reception job from among the FAX communication data list screen 1300 and instructs execution of the reply process by pressing a reply button (not shown).

In a step S2002, the CPU 201 specifies the transmission source phone of the FAX reception job selected in the step S2001 as a reply destination on the basis of the FAX job management table 715. In the next step S2003, the CPU 201 issues a job ID of the FAX job corresponding to the reply process with the job processing module 301. In the next step S2004, the CPU 201 reads a reply template that is stored in the SSD 204 and is managed by the reply template management module 307, and generates FAX reply data 1101 in FIG. 11 on the basis of the reply template concerned. The FAX reply data 1101 is stored in the SSD 204 etc.

In the next step S2005, the CPU 201 converts the FAX reply data 1101 into the FAX image 701 with the data transmission/reception module 306. In the next step S2006, the CPU 201 performs the FAX transmission of the FAX image 701 generated in the step S2005 to the destination specified in the step S2002 with the data transmission/reception module 3006.

In the next step S2007, the CPU 201 sets the information about the FAX reply job to the FAX job management table 715 with the job processing module 301. Specifically, the job ID issued in the step S2003 is set to the job ID 705 of the FAX job management table 715. The Job ID of the FAX reception job selected in the step S2001 is set to the FAX reception job ID 706. The value of "FAX transmission" is set to the job type 707. The date on which the FAX image 701 is transmitted in the step S2006 is set to the transmission/reception date 708.

A telephone number of the MFP 101 that transmits the FAX image 701 is set to the transmission source phone 709. The telephone number of the reply destination specified in the step S2002 is set to the transmission destination phone 710. The information beforehand set as the notification destination in the MFP 101 is set to the application identification information 711. The initial value of "unconfirmed" is set to the status 712. The user information about the user who logs in the MFP 101 is set to the update user 713. The information showing the storage place of the FAX reply data 1101 generated in the step S2004 is set to the FAX data storage place 714.

In the next step S2008, the CPU 201 updates the information about the FAX reception job specified in the FAX job management table 715 with the job processing module 301. Specifically, the status 712 of the FAX reception job set in the FAX job management table 715 is updated to "replied". Moreover, the update user 713 is updated to the user information about the user who logs in the MFP 101.

After that, this process is finished and the updated notification process in FIG. 16 mentioned above is executed. Thereby, the notification 601 showing that the status is updated is displayed on the operation-display unit 231a of the mobile terminal 105a held by the user B, for example. When the user B taps the notification 601, the confirmation screen in FIG. 17A is displayed on the operation-display unit 231a. The message 1701 in which the status is set to "replied" and the update user is set to "user A" is displayed on the confirmation screen. Since the message 1701 is displayed on the confirmation screen, the user B can grasp that the reply to the FAX reception job has been performed by the instruction from the user A.

Although the present invention is described using the above-mentioned embodiment, the present invention is not limited to the above-mentioned embodiment. For example, the execution of the FAX reply job and the update of the status 712 may be instructed by methods other than the chat function. For example, an application screen for instructing execution of the FAX reply job or update of the status 712 may be displayed on the operation-display unit 231 of the mobile terminal 105. A user may instruct the execution of the FAX reply job or the update of the status 712 on the basis of the instruction input on the application screen.

In such a configuration, for example, the mobile terminal 105 transmits the instruction data that is input by the user to the above-mentioned application screen in the step S1002 or the step S1902 rather than the chat text to the server apparatus. The server apparatus specifies the instruction content on the basis of the received data in the step S1003 or the step S1903. In this way, when the execution of the FAX reply job and the update of the status 712 are instructed by methods other than the chat function, the effect similar to that of the above-mentioned embodiment can be obtained even if each apparatus that constitutes the information processing system 100 is not provided with the chat function.

Although the above-mentioned embodiment described the case where the present invention is applied to the system that manages FAX data, an application of the present invention is not limited to such a system. For example, the present invention may be applied to a system in which the server apparatus 104 manages the image data generated by reading a document by the MFP 101. Such a system is used at a hospital, a school, a government office, or the like at which image data of a plurality of documents that are generated by a plurality of documents are managed for each user.

For example, at a hospital, the MFP 101 reads a plurality of documents of a patient, such as an interview sheet and a health insurance card, and generates image data of these documents, and the server apparatus 104 manages these image data for each patient. When the present invention is applied to such a system, for example, a data list screen that associates information about a first scan job that scans an interview sheet of a certain patient with information about a second scan job that scans a health insurance card of the same patient is displayed on the operation-display unit 231 of the mobile terminal 105 on the basis of a management table similar to the FAX job management table 715. The status information about the first scan job and the status information about the second scan job are displayed on this data list screen. Thereby, the user can easily grasp the processing status of the image data of each document managed for each patient.

Moreover, the present invention may be applied to a system in which the server apparatus 104 manages data received by a communication terminal like the MFP 101 through an E-mail. When the present invention is applied to such a system, the user can easily grasp the processing status of the data received through the E-mail.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-000583, filed Jan. 5, 2022, which is hereby incorporated by reference herein in its entirety.

What is claimed is:

1. A system comprising:
   an image processing apparatus being configured to receive image data by fax, wherein the image processing apparatus transmits the received image data to a server apparatus;
   the server apparatus being configured to transfer the image data and first status information indicating that the image data is not confirmed to an information terminal to be displayed by a chat function of the information terminal; and
   the information terminal being configured to display the transferred image data and the first status information by the chat function that displays characters in a chat screen, receive characters in the chat screen from a user by the chat function, and transmit the characters received in the chat screen to the server apparatus as a character string, wherein, in a case where the server apparatus receives characters for changing the first status information to second status information indicating that the image data is being confirmed, the server apparatus changes the first status information to the second status information, wherein, in a case where the server apparatus receives characters for a reply to the image data, the server apparatus transmits a reply instruction to the image processing apparatus based on the received characters and changes the first status information to third status information indicating that a reply to the image data is completed, wherein the information terminal displays the second status information based on the second status information, and wherein the information terminal displays the third status information based on the third status information.

2. The system according to claim 1, wherein the information terminal further displays information indicating that the reply to the image data is completed.

3. The system according to claim 1, wherein the information terminal further displays information indicating that the reply to the image data is completed at a position that does not overlap with the image data.

4. The system according to claim 1, wherein the information terminal displays the information indicating that the reply to the image data is completed as a message different from a message including the image data.

5. The system according to claim 1, wherein the information terminal displays the information indicating that the reply to the image data is completed under the image data.

6. The system according to claim 1, wherein the information terminal displays the transferred image data and transmission source information about the image data.

7. The system according to claim 1, wherein the information terminal displays the transferred image data and reception time of the image data.

8. The system according to claim 1, wherein another information terminal displays information indicating that the reply to the image data is completed.

* * * * *